US007029717B1

(12) United States Patent
Ojima et al.

(10) Patent No.: US 7,029,717 B1
(45) Date of Patent: Apr. 18, 2006

(54) SUCRALOSE-CONTAINING COMPOSITION AND EDIBLE PRODUCTS CONTAINING THE COMPOSITION

(75) Inventors: Naoto Ojima, Toyonaka (JP); Masami Madono, Toyonaka (JP); Kazutaka Hirao, Toyonaka (JP); Masanori Mie, Toyonaka (JP); Akiko Sato, Toyonaka (JP)

(73) Assignee: San-Ei Gen F.F.I., Inc., Osaka (JP)

( * ) Notice: Subject to any disclaimer, the term of this patent is extended or adjusted under 35 U.S.C. 154(b) by 0 days.

(21) Appl. No.: 09/958,907

(22) PCT Filed: Apr. 17, 2000

(86) PCT No.: PCT/JP00/02496

§ 371 (c)(1), (2), (4) Date: Oct. 15, 2001

(87) PCT Pub. No.: WO00/62628

PCT Pub. Date: Oct. 26, 2000

(30) Foreign Application Priority Data

| | | |
|---|---|---|
| Apr. 16, 1999 | (JP) | 11/109262 |
| Apr. 16, 1999 | (JP) | 11/109263 |
| Jul. 15, 1999 | (JP) | 11/201684 |
| Jul. 29, 1999 | (JP) | 11/215489 |
| Nov. 15, 1999 | (JP) | 11/324710 |

(51) Int. Cl.
*A23L 1/236* (2006.01)

(52) U.S. Cl. ........................ 426/548; 426/321; 426/656

(58) Field of Classification Search ................. 426/548, 426/321, 650, 656, 804
See application file for complete search history.

(56) References Cited

U.S. PATENT DOCUMENTS

| | | | |
|---|---|---|---|
| 4,751,294 | A | 6/1988 | Jackson |
| 5,013,716 | A | 5/1991 | Cherukuri et al. |
| 5,376,398 | A | 12/1994 | Cooper et al. |
| 5,380,541 | A | 1/1995 | Beyts et al. |

FOREIGN PATENT DOCUMENTS

| | | | |
|---|---|---|---|
| EP | 0 064 361 A2 | | 11/1982 |
| EP | 493919 | | 7/1992 |
| JP | 2-177869 | | 7/1990 |
| JP | 08196240 | * | 8/1996 |
| JP | 8-205814 | | 8/1996 |
| JP | 08242805 | * | 9/1996 |
| JP | 10-243776 | | 9/1998 |
| JP | 10-262601 | | 10/1998 |
| JP | 10-262604 | | 10/1998 |
| WO | 92/10168 | | 6/1992 |

OTHER PUBLICATIONS

Fennema, O.R. ed., Food Chemistry, third edition, Marcel Dekker, Inc. New York, 1996, pp. 812–821.*

Sweintek et al, *Food Processing*, 52(12):38–40 (1991).

International Search Report.

* cited by examiner

*Primary Examiner*—Leslie Wong
(74) *Attorney, Agent, or Firm*—Sughrue Mion, PLLC

(57) ABSTRACT

A composition which is obtained by causing a specific compound to be present together with sucralose. The composition provides a sucralose in a stable form, more particularly, a sucralose which is still stable and thus is significantly suppressed with respect to the decrease in sweetness and discoloration (browning blackening), even when it is subjected to a warming treatment under a condition wherein temperature is high and especially water content is low and/or pH is low. The stabilized sucralose-containing composition can be used a sweetener by itself and as a compound with a food or a drug.

3 Claims, No Drawings

SUCRALOSE-CONTAINING COMPOSITION AND EDIBLE PRODUCTS CONTAINING THE COMPOSITION

This application is a National Stage Filing of PCT/JP00/02496 filed Apr. 17, 2000.

TECHNICAL FIELD

The present invention relates to a sucralose-containing composition. More particularly, the invention relates to a sucralose preparation with the thermal stability of sucralose improved by formulating a defined substance in combination with sucralose. In addition, the present invention relates to a sucralose preparation with the sweetness (the intensity and quality of sweetness) of sucralose further improved by formulating a defined substance in combination with sucralose. The sucralose preparation of the present invention is exceptionally stable whether in solution or in dry state, not only at room temperature but also at elevated temperature, with the consequent advantage that it can be easily handled in the production, storage and distribution stages where it may be exposed to unpredictably and widely variable environmental conditions. Moreover, because of its excellent thermal stability, the sucralose-containing composition (sucralose preparation) of the present invention can be formulated as a sweetener in a variety of edible or ingestable products (e.g. foods and pharmaceuticals).

The present invention is further directed to a method of producing said sucralose-containing composition and further to an edible product in which said sucralose-containing composition has been formulated.

BACKGROUND ART

As a sweetener, sucrose (sugar) has heretofore been used broadly on the strength of its sweetness of good quality and good body (a full-bodied mouthfeel), humectant properties and viscosity-imparting characteristics. However, the recent health-mindedness and orientation of the public toward low-calorie intake have cut down on the ingestion of sucrose, which is causative of obesity and dental caries, and particularly in the field of delicacy items such as drinks and desserts, the demand for energy sparing is the order of the day. For this reason, research and development work has been in progress on high-sweetness sweeteners as substitutes for sugar and, among them, sucralose having a sweetness about 600 times as high as that of sucrose is attracting attention as a novel sweetener in view of its being a non-caries-producing, non-metabolizable and non-calorie sweetener.

In contrast to peptide sweeteners such as aspartame, sucralose ranks high in stability. It is reported that particularly in the form of an aqueous solution, sucralose remains exceptionally stable even under high temperature and low pH conditions, retaining a satisfactory sweetness profile (the intensity and quality of sweetness) (M. E. Quinlan, J. Food Sci., 55 (1), 244 (1990)). On the other hand, however, it is known that crystalline sucralose tends to be thermolabile, turning light-brown in color when stored in dry state at elevated temperature and that it is severely decomposed when stored at a temperature of about 40° C. or higher for a protracted time.

For stabilizing sucralose against discoloration under high-temperature and dry conditions and the following methods have so far been attempted.

(1) The method which comprises atomizing sucralose crystals down to a certain particle diameter (Japanese Examined Patent Publication No. 2562147); (2) the method which comprises preparing a mixed solution of sucralose and a water-soluble oligosaccharide in water and spray-drying or freeze-drying the solution to give a sweet concentrate (Japanese Examined Patent Publication No. 2521308); (3) the method which comprises converting sucralose and cyclodextrin to an eutectic complex (Japanese Unexamined Patent Publication H02-258714); (4) the method which comprises converting sucralose and a nitrogen-containing base to an eutectic complex (British Patent GB2169601 "Stabilization of Sucralose"); (5) the method which comprises dissolving sucralose together with a stabilizer (a cellulose or carbohydrate), a buffer (e.g. an organic acid and/or an organic acid salt) and a preservative (e.g. benzoic acid) in water to give a mixed solution and freeze-drying the solution (Japanese Unexamined Patent Publication H04-258269), and (6) the method which comprises stabilizing sucralose with cellulose, calcium carbonate and dicalcium phosphate (Japanese Unexamined Patent Publication H04-228048).

However, the above methods (1) and (2) are disadvantageous in that the attainable stability of sucralose is still insufficient; the methods (3) and (4) are disadvantageous in that because the final product is morphologically limited to a crystalline complex, no versatility can be obtained in the form of usage and limitations on production parameters are also considerable; and the methods (5) and (6) are lacking in universal utility because auxiliary materials not completely soluble in water are included. Thus, a sucralose preparation stabilized against heat and exploitable in a broad range of uses remained to be developed.

DISCLOSURE OF INVENTION

For the purpose of formulating sucralose, which is of use as a sweetener, stably in various edible products such as foods and pharmaceuticals and for the purpose of using sucralose as such in a more stable state, for example as a dry product such as a table sweetener, the inventors of the present invention did intensive research literally around the clock and, as a result, found that the above-mentioned disadvantages of sucralose can be overcome by formulating a defined substance in combination with sucralose, i.e. that the thermal stability of sucralose can be improved to preclude untoward events such as discoloration even on warming under rugged conditions or warming in moisture-lean state and, moreover, the reduction in sweetness due to warming can be significantly inhibited.

The present invention has been developed on the basis of the above findings.

In the first aspect, therefore, the present invention is directed to a sucralose-containing composition comprising sucralose and one or more of the under-defined substances:

Purine bases or compounds having a purine base as a constituent; pyrimidine bases or compounds having a pyrimidine base as a constituent; flavonoids or glycosides thereof; polyphenols; organic phosphoric acid compounds; hydroxy-acids or salts thereof; sulfur-containing compounds; lignans; carotenoids or glycosides thereof; tocopherols; saponins: organic acids or salts thereof; inorganic salts (inclusive of inorganic acid salts); protein hydrolysates; amino acids or salts thereof; basic substances; polyol compounds; porphyrin compounds; chelating agents; melanoidins; reductones; oils and fats; phospholipids; butylhydroxyanisole or butylhydroxytoluene; citrus fruit components; betaines or isobetanins; and shogaol, oryzanol, or ferulic acid.

In the second aspect, the present invention is directed to a sweetener comprising said sucralose-containing composition. This sweetener has good thermal stability and storage stability in moisture-lean condition, that is to say in solid state, so that it can be used not only as it is, for example as a kitchen sweetener or a table sweetener but also as a sweetener in dry-mix products such as cake mixes, powdery beverages and so forth.

In the third aspect, the present invention is directed to a method of producing said sucralose-containing composition. In the sucralose-containing composition, it is sufficient that said substance or substances coexist with sucralose but it is preferable that these components coexist in a uniformly intermingled state. The invention is particularly concerned with a method of producing such a composition.

In the fourth aspect, the present invention is directed to an ingestable or edible product containing said sucralose-containing composition. The edible product mentioned above is not only free from the untoward events such as decreased sweetness and discoloration in the course of production, storage and distribution, thanks to the thermal stabilization of sucralose by the presence of said defined substance or substances but also has a pleasing sweetness. Since sucralose coexisting with said defined substance characteristically displays eminent thermal stability under moisture-lean, low pH conditions, said ingestable product includes foods produced by heating under water-lean or low-pH conditions, such as hard candies, cookies, and fried cakes to mention a few particularly useful examples.

In the fifth aspect, the present invention provides various uses for said defined substance which are relevant to sucralose. Among such uses are the use as a thermal stability-improving agent for sucralose, the use as a discoloration inhibitor for sucralose, and the use as a sweetness improving agent for sucralose.

BEST MODE FOR CARRYING OUT THE INVENTION

Sucralose for use in the present invention is structurally characterized in that, as represented by the following formula (I), the three hydroxyl groups in the 1,6-positions of the fructose residue and the 4-position of the glucose residue within the sucrose molecule have been replaced by chlorine atoms (4,1',6'-trichlorogalactosucrose; chemical name: 1,6-dichloro-1,6-dideoxy-B-D-fructofuranosyl-4-chloro-4-deoxy-a-D-garactopyranoside) and is a non-calorie, non-dental caries-producing high-sweetness sweetener having a quality sweetness about 600 times as high as that of sucrose [British Patent No. 1543167].

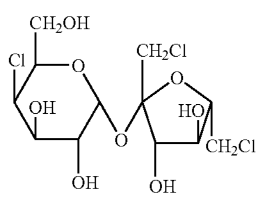

(I)

I. Sucralose-Containing Composition and Method of Producing the Same

The present invention has been developed on the basis of the finding that the stability of sucralose is enhanced in the presence of a defined substance to preclude untoward events such as discoloration regardless of moisture content and even under comparatively rugged conditions such as heating and that the reduction in sweetness (intensity and quality) of sucralose is then significantly inhibited, enabling sucralose to retain a satisfactory sweetness.

The defined substance mentioned above includes the following:

(1) Purine bases or compounds having a purine base as a constituent, (2) pyrimidine bases or compounds having a pyrimidine base as a constituent, (3) flavonoids or glycosides thereof, (4) polyphenols, (5) organic phosphoric acid compounds, (6) hydroxy acids or salts thereof, (7) sulfur-containing compounds. (8) lignans, (9) carotenoids or glycosides thereof, (10) tocopherols, (11) saponins, (12) organic acids or salts thereof, (13) inorganic salts (inclusive of inorganic acid salts), (14) protein hydrolysates, (15) amino acids or salts thereof, (16) basic substances, (17) polyol compounds, (18) porphyrin compounds, (19) chelating agents, (20) melanoidins, (21) reductones, (22) oils or fats, (23) phospholipids, (24) butylhydroxyanisole or butylhydroxytoluene, (25) citrus fruit components, (26) betaines or isobetanins, and (27) shogaol, oryzanol, or ferulic acid.

The purine base in the context of the present invention is a generic term denoting purine and purine derivatives as derivatized by substituting a purine nucleus in one or more arbitrary positions, including such species as adenine, guanine and hypoxanthine, among others. The compound having a purine base as a constituent includes nucleosides, nucleotides, oligonucleotides and polynucleotides each having a purine base as a constituent, namely such nucleosides as adenosine, guanosine and inosine; such nucleotides as adenylic acid, guanylic acid and inosinic acid; such oligonucleotides as oligoadenylic acid; and such polynucleotides as polyadenylic acid and so forth. The nucleotides, oligonucleotides and polynucleotides may each be in the form of a salt which is preferably a salt with an alkali metal such as sodium or potassium. These compounds can be used each independently or in an arbitrary combination of two or more species.

The preferred purine base or compound having a purine base as a constituent includes inosine, hypoxanthine, inosinic acid, adenylic acid, guanylic acid and the sodium salts of these nucleotides. Among these, inosinic acid and sodium inosinate are particularly effective in preventing the discoloration of sucralose (inclusive of browning and blackening) during high-temperature storage and, therefore, can be used with advantage as discoloration inhibitors.

The pyrimidine base in the context of the present invention is a generic term denoting pyrimidine and pyrimidine derivatives as derivatized by substituting a pyrimidine nucleus in one or more arbitrary positions, such as uracil, cytosine and thymine, among others. The compound having a pyrimidine base as a constituent in the context of the invention includes nucleosides, nucleotides, oligonucleotides and polynucleotides having a pyrimidine base as a constituent, for example such nucleosides as cytidine, uridine and thymine; such nucleotides as cytidylic acid, uridylic acid and thymidylic acid; such oligonucleotides as oligouridylic acid etc., and such polynucleotides as polyuridylic acid and so forth. These nucleotides, oligonucleotides and polynucleotides may each be used in the form of a salt which is preferably a salt with an alkali metal such as sodium or potassium. These may be used each independently or in an arbitrary combination of two or more species.

The preferred pyrimidine base and compound having a pyrimidine base as a constituent include cytidylic acid, uridylic acid, and the sodium salts of these nucleotides.

In the present invention, nucleic acids as such, a yeast extract containing such nucleic acids, and the like may optionally be used as said purine base, said pyrimidine base or said nucleosides and nucleotides (oligonucleotides and polynucleotides) having such a base as a constituent.

In the context of the invention, the flavonoid is a generic term denoting compounds having a 2-phenylchromone nucleus, thus including flavonols, flavones, isoflavones, flavanones, flavanonols, catechin, aurone, hesperetin and anthocyanidins, among others. In the present invention, various glucosides having such flavonoids as aglicone can be used in lieu of, or in combination with, said flavonoids. Specifically, the flavonoides and glycosides thereof include flavonols such as quercetin, myricetin quercetin and morin; flavonol glycosides such as quercitrin, isoquercitrin, myricitrin, and rutin; flavones including flavone, apigenin and luteolin; isoflavones such as daidzein etc.; isoflavone glycosides such as daidzin etc.; flavanones such as hesperitin etc.; flavanone glycosides such as hesperidin, methylhesperidin and nalindin; flavanonols; flavanonol glycosides; catechin glycosides; aurone such as benzalcoumaranion etc.; aurone glycosides; anthocyanidins such as proanthocyanidin, pelargonidin, etc.; and anthocyanidin glycosides such as anthocyanin and pelargonin.

These may be used each independently or in an arbitrary combination of two or more species. In the present invention, any material containing such a flavonoid or flavonoid glycoside can be employed; i.e. flavonoid-containing colors such as red cabbage color, purple potato color, and purple corn color can be utilized.

The preferred flavonoid or flavonoid glycoside includes such flavonol glycosides as quercitrin and myricitrin; such flavanone glycosides as hesperidin and methylhesperidin; and such anthocyanidin glycosides as pelargonin.

In the context of the present invention, polyphenol is a generic term denoting phenols containing two or more hydroxyl groups within a molecule. Specifically, tannic acid, tannin, gallic acid, catechol and coffeic acid can be mentioned as examples.

These may be used each in the form of a salt, for example a salt with an alkali metal such as sodium or potassium or a salt with an alkaline earth metal such as magnesium or calcium. These may be used each independently or in an arbitrary combination of two or more species. The preferred polyphenol for use in the invention includes tannic acid, gallic acid and catechol.

The organic phosphoric acid compound in the context of the invention includes phytic acid, glycerophosphoric acid, riboflavin phosphate, starch phosphate, etc. and their salts. The salts may be salts with alkali metals such as sodium and potassium or salts with alkaline earth metals such as magnesium and calcium. The preferred are sodium salts. These may be used each independently or in an arbitrary combination of two or more species. The preferred organic phosphoric acid compound includes phytic acid, glycerophosphoric acid, riboflavin phosphate, and their salts (particularly sodium salts).

The hydroxy acid in the context of the invention is a generic term denoting compounds having a carboxyl group and an alcoholic hydroxyl group within the molecule, thus including lactic acid, gluconic acid, tartaric acid, ketogluconic acid, glyceric acid, malic acid and citric acid, to mention just a few examples. The hydroxy acid can be used in the form of a salt, for example the salt with an alkali metal such as sodium or potassium or the salt with an alkaline earth metal such as magnesium or calcium. These may be used each independently or in an arbitrary combination of two or more species. The preferred are lactic acid, calcium lactate, gluconic acid, sodium gluconate, tartaric acid, sodium tartrate, malic acid and sodium malate.

The sulfur-containing compound in the context of the invention is a generic term denoting compounds containing sulfur within the molecule, thus including glutathione, methionine, cysteine, cystine, indigo carmine and so forth. These may be used each independently or in an arbitrary combination of two or more species. The preferred are glutathione, indigo carmine, cystein and methionine and the more preferred are glutathione and indigo carmine.

The lignan in the context of the invention is a generic term denoting plant components consisting of a couple of C6–C3 units, i.e. plant-derived substances having a β, γ-dibenzylbutane nucleus, thus including sesame seed components such as sesamin, sesamolin, sesamol, and sesaminol, among others. These may be used each independently or in an arbitrary combination of two or more species. The preferred species is sesamol. In the present invention, a material containing a lignan can be used in lieu of the lignan as such and sesame oil can be mentioned as a typical example of such material.

The term carotenoid in the context of the invention means any and all yellow or red colors (carotenoid colors), including aliphatic or alicyclic polyenes containing a large number of conjugated double bonds. Specifically, various carotene species such as α-carotene, β-carotene and γ-carotene, lycopene and capsaicin can be mentioned as examples. The preferred are the carotene species mentioned above. In the present invention, glycosides of carotenoids can also be employed and, as such a compound, there can be mentioned a gardenia color composed of the carotenoid crocetin and glucose. These carotinoids and glucosides thereof can be used each independently or in an arbitrary combination for two or more species.

The tocopherol for use in the invention includes α-, β-, γ- and δ-tocopherols (each inclusive of d- and d1-forms) and lower fatty acid esters thereof. These may be used each independently or in an arbitrary combination of two or more species. The preferred species are β-tocopherol and γ-tocopherol.

The saponin for use in the invention includes steroid saponins (C27) and triterpenoid saponins (C30). Specifically, such steroid saponins as digitonin and dioscine and such triterpenoid saponins as glycyrrhizin and soybean saponin can be mentioned. Furthermore, as said glycyrrhizin, licorice (*Glycyrrhiza glabra*) and licorice extracts containing it as a constituent can also be employed. These may be used each independently or in an arbitrary combination of two or more species. The preferred is glycyrrhizin.

The organic acid for use in the invention includes succinic acid, acetic acid, fumaric acid, itaconic acid, ketoglutaric acid, adipic acid and gluconic acid. These organic acids may each be used in the form of a salt which may, for example, be the salt with an alkali metal such as sodium or potassium or the salt with an alkaline earth metal such as magnesium or calcium. These may be used each independently or in an arbitrary combination of two or more species. Furthermore, gluconic acid can be used in the derivative form of gluconolactone. The preferred species are acetic acid, fumaric acid, succinic acid, and sodium salts thereof.

The inorganic salt for use in the invention includes the alkali metal salts (salts with sodium or potassium) and alkaline earth metal salts (salts with magnesium or calcium) of various inorganic acids such as phosphoric acid, metaphosphoric acid, pyrophosphoric acid, polyphosphoric acid, nitric acid, sulfuric acid, carbonic acid, etc.; and such alkali metal salts as sodium chloride and potassium chloride and such alkaline earth metal salts as magnesium chloride and calcium chloride. These may be used each independently or in an arbitrary combination of two or more species. The preferred are salts of an inorganic acid such as phosphoric acid, metaphosphoric acid, pyrophosphoric acid or polyphosphoric acid, and sodium chloride. The more preferred are phosphates, particularly disodium hydrogenphosphate, and sodium chloride.

The protein hydrolysate in the context of the invention may be any hydrolysis product of protein, including mixtures of polypeptides, peptides and amino acids. The protein may be of any origin; thus it may be a protein of the animal origin or a protein of the vegetable origin. Moreover, the degree of hydrolysis is not particularly restricted inasmuch as the protein has not been completely degraded to its component amino acids or amino acid salts and can serve the purposes of the invention. The protein hydrolysate specifically includes hydrolysates of animal proteins, for example casein-derived peptides such as casein phosphopeptide (α-CPP, β-CPP), casein macropeptide and casein dodecapeptide and whey protein hydrolysates, and hydrolysates of vegetable proteins, such as soybean peptides which are products of hydrolysis of soybean proteins. The preferred are casein-derived peptides and soybean peptides.

The amino acid compound in the context of the invention means any and all of amino acid, oligoamino acid (peptide), polyamino acid (polypeptide), and amino acid derivative. Specifically, such amino acids as arginine, hystidine, glycine, alanine, serine, glutamic acid, aspartic acid, lysine, tryptophan, etc: oligoamino acids; such polyamino acids as polylysine etc.; such amino acid derivatives as betaines (trialkylated amino acids), e.g. trimethylglycine; and theanine.

These amino acids may each be in the form of a salt, an acid addition product or a hydrate, and as specific examples, arginine hydrochloride and sodium glutamate may be mentioned. These may be used each independently or in an arbitrary combination of two or more species.

The basic substance for use in the invention includes alkaloids having a purine base nucleus, such as caffeine, nicotinamide, glucosamine, chitosan, pyridoxine hydrochloride, and folic acid. These may be used each independently or in an arbitrary combination of two or more species. The preferred are caffeine and nicotinamide.

The polyol compound in the context of the invention means any and all diol compounds and polyol compounds, thus including ascorbic acid, ascorbyl stearate, ascorbyl palmitate, isoascorbic acid, inositol, and sugar alcohol. The sugar alcohol includes but is not limited to erythritol, sorbitol, mannitol, maltitol, palatinose, lactitol, xylitol, arabitol, galactitol and ribitol. These may be used each independently or in an arbitrary combination of two or more species.

The porphyrin compound in the context of the invention includes protoporphyrin, porphyrin, chlorophyll, biliverdin and pyrrole. These maybe used each independently or in an arbitrary combination of two or more species.

The chelating agent in the context of the invention is a generic term denoting all chemical substances having a multidentate ligand capable of coupling a metal ion to form a chelate compound, including polyaminocarboxylic acids, such as ethylenediaminetetracetic acid (EDTA), salts thereof, dimethylglyoxime, and so forth. These may be used each independently or in an arbitrary combination of two or more species. The preferred are EDTA and EDTA sodium salt.

Melanoidin in the context of the invention is a brown-colored nitrogenous substance which is produced from a reducing sugar and an amino compound by the so-called melanoidin reaction (alias Maillard reaction).

Reductone in the context of the invention is a generic term denoting all strongly reducing substances that reductively decolorize Tillman reagent, thus meaning any compound having a carbonyl group adjacent to ethylenediol. Specifically, vitamin C and to glucoreductone, among others, can be mentioned.

The oil or fat in the context of the invention is not particularly restricted insofar as the expected effect of the invention may be expressed, and, as such, includes beef tallow, lard, rapeseed oil, corn oil, safflower oil, sesame oil and so forth. The preferred is sesame oil.

The phospholipid in the context of the invention is a kind of compound lipid, including phosphatidic acid, phosphatidylglycerin and phosphatidylcholine, inclusive of hydrolysates and glycerol adducts thereof. These may be used each independently or in an arbitrary combination of two or more species.

The citrus fruit component in the context of the invention includes fruit juice components of plants belonging to the any of genus Citrus, the genus Fortunella, and the genus Poncirus, and such fruit juice includes orange juice, lemon juice and yuzu juice, among others. The fruit juice may be the juice just obtained by squeezing the fruit but in order that the opacification or sedimentation due to hesperidin and other ingredients may be prevented, it is good practice to use a fruit juice treated with an enzyme, such as hesperidinase, in advance. The form of said fruit juice component is not restricted but may be a liquid or a solid available on desiccation of the liquid (e.g. powders, granules and the like).

The betaine or isobetanin is a red color component obtainable from red beet. In the present invention, beet red (a betacyanine color) containing betaine or isobetanin as a principal ingredient can be used as said betaine or isobetanin.

The sucralose-containing composition of the present invention includes the following specific preparations.

(1) A sucralose preparation further containing a purine base or a compound having a purine base as a constituent.
(2) A sucralose preparation further containing a pyrimidine base or a compound having a pyrimidine base as a constituent.
(3) A sucralose preparation further containing a flavonoid or flavonoide glycoside.
(4) A sucralose preparation further containing a polyphenol.
(5) A sucralose preparation further containing an organic phosphoric acid compound.
(6) A sucralose preparation further containing a hydroxyl acid or a salt thereof.
(7) A sucralose preparation further containing a sulfur-containing compound.
(8) A sucralose preparation further containing a lignan.
(9) A sucralose preparation further containing a carotenoid or carotenoid glycoside.
(10) A sucralose preparation further containing a tocopherol.
(11) A sucralose preparation further containing a saponin.
(12) A sucralose preparation further containing an organic acid or a salt thereof.
(13) A sucralose preparation further containing an inorganic salt.
(14) A sucralose preparation further containing a protein hydrolysate.
(15) A sucralose preparation further containing an amino acid compound.
(16) A sucralose preparation further containing a basic substance.

(17) A sucralose preparation further containing apolyol compound.

(18) A sucralose preparation further containing a porphyrin compound.

(19) A sucralose preparation further containing a chelating agent.

(20) A sucralose preparation further containing a melanoidin.

(21) A sucralose preparation further containing a reductone.

(22) A sucralose preparation further containing an oil or fat.

(23) A sucralose preparation further containing a phospholipid.

(24) A sucralose preparation further containing butylhydroxyanisole or butylhydroxytoluene.

(25) A sucralose preparation further containing a citrus fruit juice component.

(26) A sucralose preparation further containing a betaine or isobetanin.

(27) A sucralose preparation further containing shogaol, oryzanol or ferulic acid.

The defined substances mentioned hereinabove may each be incorporated independently in the sucralose preparation as it is the case with the above specific preparations (1)–(27) but two or more of the substances may be formulated together in combination with sucralose.

Thus, the sucralose preparation of the present invention is a composition comprising sucralose and one or more substances selected from the group consisting of purine bases, compounds containing a purine base as a constituent, pyrimidine bases, compounds containing a pyrimidine base as a constituent, flavonoids, flavonoid glucosides, polyphenols, organic phosphoric acid compounds, hydroxy acids, hydroxy acid salts, sulfur-containing compounds, lignans, carotenoids, carotenoid glucosides, tocopherols, saponins, organic acids, organic acid salts, inorganic salts, protein hydrolysates, amino acids, basic substances, polyol compounds, porphyrin compounds, chelating agents, melanoidins, reductones, fats or oils, phospholipides, butylhydroxyanisole, butylhydroxytoluene, citrus fruit juice components, betaines, isobetanins, shogaol, oryzanol and ferulic acid.

Among such compositions, the composition comprising sucralose and one or more substances selected from the group consisting of compounds having a purine base as a constituent (nucleosides and nucleotides or salts thereof), organic phosphoric acid compounds, hydroxy acids, hydroxy acid salts, sulfur-containing compounds, saponins, organic acids, organic acid salts, inorganic salts and amino acids is particularly satisfactory in terms of thermal stability (discoloration inhibitory effect, sweetness reduction inhibitory effect, taste-improving effect) and, therefore, is of use as a versatile composition. As the preferred substances, there can be mentioned sodium inosinate, sodium citrate, potassium citrate, calcium citrate, sodium phytate, potassium phytate, calcium phytate, calcium lactate, DL-methionine, arginine hydrochloride, glycyrrhizin, calcium gluconate, sodium gluconate and sodium sulfate.

It is sufficient that the sucralose preparation according to the invention contains sucralose and at least one member selected from among the above-defined substances, and may be in any desired form, for example powdery, granular, solid (tablets, pills, etc.), or liquid. The preferred form is powders, granules or a solid.

The technology of producing said preparation is not particularly restricted but includes the method which comprises blending a powder of sucralsoe with a powder of said substance to give a powdery mixture, the method which comprises spraying a powder or granulation of sucralose with a solution of said substance, the method which conversely comprises spraying a solution of said substance over a powder or granulation of sucralose, the method which comprises mix-dispersing sucralose and said substance in a liquid medium to prepare a slurry and extruding the dispersion to prepare a granulation, and the method which comprises dissolving sucralose and said substance together and drying the solution. The drying can be effected by any desired method: for example, spray-drying, drum-drying, freeze-drying and other techniques can be mentioned.

The preferred sucralose preparation is a powdery, granular or solid composition which can be obtained by dissolving sucralose and said substance together in water or mixing an aqueous solution of sucralose with an aqueous solution of said substance in the first place and, then, drying the solution or mixture.

The formulation levels of sucralose and said substance in the sucralose composition are not particularly restricted but can be judiciously selected within the range conducive to the effect of the invention. By way of illustration, the proportion of said defined substance relative to sucralose in the preparation is not less than 0.0001 part by weight, preferably not less than 0.001 part by weight, more preferably not less than 0.01 part by weight, based on each part by weight of sucralose. There is no particular upper limit from the standpoint of the effect of the invention, although extraneous factors such as the influence of the taste and aroma of the very substance used should be taken into consideration.

Within the limit not interfering with the effect of the invention, the sucralose preparation according to the invention may contain, in addition to sucralose and said defined substance, other sweeteners, flavors, antiseptics, stabilizers and other ingredients.

The other sweeteners mentioned just above may be the sweetening substances which are already known or expected to be known in the future, including α-glycosyl transferase-treated stevia, α-cyclodextrin, β-cyclodextrin, aspartame, acesulfam potassium, N-acetylglucosamine, arabinose, allitame, isotrehalose, isomaltitol, isomaltooligosaccharide (isomaltose, isomaltotriose, panose, etc.), erythritol, oligo-N-acetylglucosamine, galactose, galactosylsucrose, galactosyllactose, galactopyranosyl(β1–3)galactopyranosyl(β1–4)glucopyranose, galactopyranosyl(β1–3)glucopyranose, galactopyranosyl(β1–6)galactopyranosyl(β1–4)glucopyranose, galactopyranosyl(β1–6)glucopyranose, licolice extract (glycyrrhizin), xylitol, xylose, xylooligosaccharide (xylotriose, xylobiose, etc.), glycerol, triammonium glycyrrhetinate, tripotassium glycyrrhetinate, trisodiumglycyrrhetinate, diammonium glycyrrhetinate, dipotassiumglycyrrhetinate, disodium glycyrrhetinate, curculin, glucose, gentiooligosaccharide (gentiobiose, gentiotriose, gentiotetraose, etc.), saccharin, saccharin sodium, cyclamate, sucrose, stachyose, stevia extract, stevia powder, dulcin, sorbitol, sorbose, thaumatin, theandeoligo, theandeoligosaccharide, tenryo-cha extract, trehalulose, trehalose, Nigeria berry extract, nigerooligosaccharide (nigerose etc.), neotame, neotrehalose, neohesperidindihydrochalcone, palatinit, palatinose, palatinose oligosaccharide, palatinose syrup, fucose, fructooligosaccharide (ketose, nystose, etc.), fructosyl transferase-treated stevia, fructofuranosylnystose, Brazilian licolice extract, fructose, polydextrose, maltitol, maltose, maltosyl-β-cyclodextrin, maltotetraitol, maltotriitol, maltooligosaccharide (maltotriose, tetraose, pentaose, hexaose, heptaose, etc.) mannitol, miracle fruit extract, melibiose, rakanka extract, lactitol, lactulose, lactose, raffinose, rhamnose, ribose, isomerized syrup, reducing isomaltooligosaccharide, reducing xylooligosaccharide, reducing gentiooligosaccharide, reducing maltose syrup, reducing starch syrup, enzyme-treated licolice, enzymatically degraded licorice, coupling sugar, soybean oligosaccharide, invert sugar, starch syrup, honey and so forth.

As the sucralse-containing compositions further containing such sweeteners as above in accordance with the invention, the following preparations can be mentioned by way of example.

(1) A sucralose preparation obtainable by spray-drying a syrup containing sucralose, at least one species of said defined substance and sucrose together with an inert gas and contacting it further with crystalline sucrose; (2) a sucralose preparation obtainable by granulating a composition comprising sucralose and at least one species of said defined substance using reducing palatinose as an excipient;

(3) a sucralose preparation obtainable by depositing or coating a composition comprising sucralose and at least one species of said defined substance on an oligosaccharide; (4) a sucralose preparation obtainable by granulating a composition comprising sucralose and at least one species of said defined substance using lactitol as an excipient; (5) a sucralose preparation obtainable by covering the surface of erythritol crystals with a composition comprising sucralose and at least one species of said defiend substance (optionally further containing a sizing agent such as gelatin or locust bean gum as a binder); (6) a sucralose preparation obtainable by crystallizing from a supersaturated aqueous solution of erythritol formulated with a composition comprising sucralose and at least one species of said defined substance; (7) a sucralose preparation obtainable by spray-drying an aqueous solution containing sucralose, at least one species of said defined substance, and erythritol; and (8) a sucralose preparation obtainable by adding a composition comprising sucralose and at least one species of said defined substance to a highly-concentrated aqueous solution or hot melt of erythritol, kneading the mixture for crystallization and crushing the resulting solid.

The sucralose preparation according to the present invention can be used not only as a kitchen sweetener or a table sweetener, substituting for sucrose and other sweeteners which are conventionally used for sweetening purposes but also as a sweetener to be formulated in all kinds of edible products (for example, foods, oral medicines, mouth refreshers, mouthwashes, dentifrices, etc).

The sucralose preparation according to the present invention is characterized in that regardless of its moisture content, it is highly stable against heat, hence retaining a high-intensity, high-quality sweetness and not undergoing undesirable changes such as discoloration (inclusive of browning and blackening) even under rugged temperature conditions to which it may be exposed during production, storage, distribution, and display. The investigation done by the inventors of the present invention revealed that whereas sucralose as such is comparatively stable in solution, its thermal stability is compromised in water-lean solid state, with the result that when it is exposed to an elevated temperature, its sweetness is reduced and discoloration also takes place. The sucralose preparation according to the invention is highly stable against heat even in water-lean dry state and, in this respect, the above shortcoming of sucralose has been obviated and this sweetener is made easier to handle and more universally useful.

As mentioned hereinbefore, the sucralose preparation of the present invention is not particularly restricted in form or mode of use and can be used in any of solid, liquid and semisolid forms. However, since a more prominent thermal stabilizing effect (prevention of discoloration, prevention of deterioration in sweetness) can be realized when it is used in water-lean condition, with statistical significance as compared with the use of sucralose alone, this preparation is particularly useful for solid-state applications. The water-lean condition mentioned above usually means a condition in which the moisture content is not more than 20 weight %, particularly not more than 15 weight %, based on the whole composition but the water content conducive to a still more prominent effect of the sucralose preparation of the invention is not more than 5 weight %.

II. Edible Products Containing the Sucralose Preparation

The sucralose composition of the present invention can be used in the preparation of edible products of which sweetness is required. Therefore, the present invention is directed to an edible product containing said sucralose preparation, more particularly an edible product containing sucralose and said defined substance.

The edible product to which the present invention is directed includes a broad range of products which are ingested by mouth and products which are utilized in the mouth. Thus, there can be mentioned various foods inclusive of seasonings, salted foods, cakes and drinks; oral medicines inclusive of dragees, drops, troches, oral or throat sprays, and syrups; quasi-drugs for oral cavity antisepsis or cleaning, such as mouth refreshers, e.g. mouth sprays, mouth washes, gargles, dentrifices, and so forth.

Specific foodstuffs are not particularly restricted but cover a broad range of farm and fishery products inclusive of beverages in general, e.g. nonalcoholic beverages such as fruit drinks containing various fruit juices, vegetable juices, carbonated drinks such as cola, ginger ale, cider, etc.; sport drinks and other soft drinks; coffee, black tea, ground green tea and other tea drinks; milk drinks such as cocoa and lactic acid bacteria drink; confections inclusive of desserts such as yoghurt, jelly, pudding, form froth (mousse), etc.; baked or steamed cakes inclusive of Western style and Japanese style confections such as cakes and buns with bean jam fillings, snack cakes, etc.; frozen cakes or glaces such as ice cream and sherbet; other sweetmeats in general, such as chewing gum, hard candy, nougat candy, jelly bean, etc.; powdery, granular or solid (pellet, tablet) dry sweeteners such as kitchen sweeteners and table sweeteners and various other condiments; dry mix products, e.g. powdery cake premixes such as cake mix, pudding mix and bavarois mix, and powdery drinks sauces inclusive of fruit flavored sauce and chocolate sauce; creams such as butter cream, raw cream, etc.; jams such as strawberry jam and marmalade; bread inclusive of "cake" bread; sauces such as tare (dressings) for broiled meat, broiled chicken, broiled eel, etc. and tomato ketchup; kamaboko and other fish paste products; retort foods, pickles, soy-cooked foods, delicatessen foods, and frozen foods.

The amount of the sucralose preparation of the invention for use in such edible products is not particularly restricted only provided that it is effective enough to impart the desired degree of sweetness to the edible product. Sweetness is available parameter which depends on the type of substrate product, other ingredients in the edible product, and the individual predilection in terms of sweetness and, therefore, the formulating amount of the sucralose preparation can be judiciously selected and adjusted according to the expertice of one skilled in the art so as to achieve the desired taste in the end product.

Because of its improved thermal stability, the sucralose preparation according to the invention is useful as a sweetener for those edible products which are heated to a high temperature in the course of production, particularly edible products (preferably foods) which are heat-treated in water-lean state and/or under acidic conditions.

While sucralose is inherently a thermally stable compound, a heat treatment, particularly under rugged conditions, e.g. in water-lean state or under low pH conditions, causes a deterioration of thermal stability, a degradation (reductions) of sweetness, and discoloration. In the sucralose preparation of the present invention, the thermal stability of sucralose has been improved or potentiated so that even when the preparation is formulated into edible products which are subjected to severe heating in the course of production, it does not suffer from a degradation (reductions) of sweetness, discoloration and other troubles, thus enabling production of edible products having good gustatory and other qualities. Furthermore, although sucralose remains stable under neutral alkaline (high pH) conditions, it is comparatively unstable under acidic (low pH) conditions. The sucralose preparation of the invention has been improved in this stability of sucralose under low pH conditions and, as such, is of value as a sweetener for those foods which are stored under low pH conditions for an extended period of time or edible products subjected to heat treatment.

As a preferred example of such edible product, there can be mentioned a hard candy. The hard candy is manufactured by dissolving the starting liquid sugar, heat-treating it to adjust it to the proper fluidity, and further boiling it down until the water content of the liquid sugar has been reduced to not more than about 3%. With the sucralose preparation of the invention, high-quality candies can be manufactured without encountering degradation (reductions) of sweetness, discoloration and other troubles. While the pH of hard candies is not restricted but may be acidic, neutral or alkaline, the hard candy suited to the sucralose preparation of the invention includes acidic hard candies calling for acidic tastes, such as a lemon, orange, strawberry or other fruit taste, a yogurt taste or a cola taste, particularly hard candies in the range of pH 2–5.

The defined substance to be formulated in combination with sucralose in hard condies may be any of the specific substances mentioned hereinbefore but it is preferably used in the form of a salt.

The salt in this context is a generic term denoting compounds derived from acids by substitution of a cation, such as a metal ion or an ammonium ion, for one or more dissociable hydrogen ions, and means the product of neutralization reaction between an acid and a base. The salt includes all kinds of salts, namely a normal salt such that the hydrogen ions of an acid have been completely replaced with other cations; an acidic salt which is a hydrogen ion ($H^+$)-containing salt; a basic salt which is a hydroxyl ($OH^-$)- or oxide ion ($O^{2-}$)-containing salt; a simple salt which is composed of only one kind of salt; a double salt which is composed of two or more kinds of salts: a complex salt which is a complex ion-containing salt; a hydrate (hydride salt); and an anhydride.

More particularly, the substance to be used in combination with sucralose in the hard candy according to the invention includes salts of nucleotides having a purine base, preferably salts of inosinic acid; salts of phytic acid which is an organic phosphoric acid compound: salts of hydroxy acids such as citric acid, lactic acid, malic acid, tartaric acid, gluconic acid, ketogluconic acid and glyceric acid; salts of organic acids such as acetic acid, succinic acid, fumaric acid, adipic acid, ketoglutaric acid, itaconic acid and pantothenic acid; and salts of inorganic acids such as phosphoric acid, polyphosphoric acid, metaphosphoric acid, pyrophosphoric acid, nitric acid, sulfuric acid, carbonic acid and hydrochloric acid. The preferred are salts of such acids as inosinic acid, phytic acid, citric acid, lactic acid, malic acid, tartaric acid, gluconic acid, succinic acid, fumaric acid, adipic acid, phosphoric acid, polyphosphoric acid, metaphosphoric acid, pyrophosphoric acid and so forth.

The base moiety of the salt includes alkali metals such as sodium and potassium; and alkaline earth metals such as calcium and magnesium, with sodium, potassium and calcium being preferred.

The more preferred salt to be used in combination with sucralose includes trisodium citrate, sodium lactate, tripotassium citrate, disodium hydrogenphosphate, sodium dihydrogenphosphate, dipotassium hydrogenphosphate, potassium dihydrogenphosphate, calcium lactate, sodium malate, sodium tartrate, sodium gluconate and sodium inosinate.

The above salts can be used each independently or in an arbitrary combination of two or more species.

The formulating amount of said substance to be used in combination with sucralose in the hard candy varies with different species of substance and cannot be stated in general terms but when trisodium citrate or calcium lactate, for instance, is used as said substance, it can be formulated in a proportion of not less than 0.001 part by weight per 100 parts by weight of the hard candy. The preferred proportion is not less than 0.005 part by weight and the more preferred proportion is not less than 0.02 part by weight. There is substantially no upper limit from the standpoint of the effect of the invention, although the taste of said defined substance, among other variables, should be taken into consideration. The formulating amount of sucralose, from the standpoint of imparting the desired sweetness to the candy, may generally be 0.001–0.2 part by weight per 100 parts by weight of the hard candy.

The hard candy of the invention is not particularly restricted insofar as it contains sucralose and at least one species of said defined substance as essential ingredients. Thus, it may contain other ingredients such as various carbohydrates and food additives which are generally formulated for hard candies, for example flavors (inclusive of essential oils) and colors.

All that is necessary is that the hard candy of the invention should contain sucralose and said defined substance in coexistence and the timing and method of formulating sucralose and said defined substance in the course of manufacture are not particularly restricted. It is good practice, however, to formulate said substance before formulation of sucralose or formulate both in one operation to bring them into coexistence. It should be understood that said substance need only be present in the raw material of the hard candy in the stage of heat treatment of the material and that the timing of addition is not restricted. However, depending on the specific substance used, the substance may undergo browning in the boiling stage. Therefore, in the manufacture of hard candies which should be protected against browning, the substance is preferably added after the boiling process. Though it is possible to add said substance as such to the raw material of a hard candy, it is likewise possible to formulate a food material containing said substance, such as a dairy product or a fruit juice, into said raw material.

Excepting the above aspect, the hard candy of the invention can be produced by the process in routine use for the production of hard candies in general. A specific process may comprise dissolving desired carbohydrates, such as sucrose, starch syrup and various sugar alcohols together in water, boiling the solution under atmospheric pressure or reduced pressure to a water content of about 3% or less, adding sucralose and at least one species of said substance, optionally as well as various auxiliary materials such as an acidulant, flavor, pigment, etc. while the high temperature necessary to achieve a moldable fluidity is maintained, filling a die with the mixture and cooling the molding to solidify in situ. The temperature of the raw material for a hard candy which insures a fluidity necessary for filling and molding is about 100–160° C. The procedure of filling and molding the raw material in a die can also be a routine one and specifically includes the deposit method and the stamping method.

The addition of sucralose is preferably made using an aqueous solution adjusted to a suitable concentration of, for example, 25%. The pH adjustment for hard candies having acidity, particularly pH 2–5, can also be carried out in the conventional manner. Particularly in the case of an acidic hard candy, the thermal stability of sucralose can be remarkably enhanced by causing said defined substance to coexist with sucralose, and the present invention is particularly useful for the production of acidic hard condies.

In accordance with the invention, the enhanced thermal stability of sucralose in the presence of said substance precludes reductions in sweetness, discoloration and other troubles even in the boiling process carried out at high temperature, which is essential to the manufacture of hard candies, thus enabling sucralose-containing hard candies of high quality to be provided. Furthermore, since the invention contributes to a marked improvement in the themal stability of sucralose particularly in the acidic region by causing said substance to coexist with sucralose, the sucralose preparation can be used with particular advantage as a sweetener for acidic hard condies.

III. Method of Improving the Thermal Stability of Sucralose

As mentioned above, said defined substance when caused to coexist with sucralose may significantly inhibit undesirable phenomena such as reductions in sweetness (the intensity or quality of sweetness) and discoloration (browning, blackening) which would otherwise occur when sucralose is subjected to heating under rugged conditions, e.g. at high temperature, under moisture-lean conditions, or under low pH conditions, or long-term storage at elevated temperature.

The present invention, therefore, provides a novel use of said defined substance, i.e. the use as a thermal stability-enhancing agent for sucralose. The invention further provides a method of improving the thermal stability of sucralose which comprises causing at least one species of said defined substance to coexist with sucralose.

In this connection, since the thus-improved thermal stability of sucralose results in an inhibition of discoloration (browning and blackening) which would otherwise occur in heat treatment or storage at elevated temperature, the above-mentioned thermal stability-enhancing agent and method of improving the thermal stability of sucralose can be defined also as a discoloration inhibitor (an inhibitor of browning/blackening) and a method of inhibiting discoloration (browning/blackening inhibiting method), respectively.

Thus, in other aspects, the present invention provides a new use of said defined substance, that is the use as a sucralose discoloration inhibitor (an inhibitor of browing/blackening), and a method of inhibiting discoloration of sucralose (browning/blackening inhibiting method) which comprises causing at least one species of said defined substance to coexist with sucralose.

The substance caused to coexist with sucralose as said thermal stability-enhancing agent is not particularly restricted inasmuch as it is chosen from among the specific substances mentioned hereinbefore but the preferred species are compounds having a purine base as a constituent (nucleosides, nucleotides and salts thereof), organic phosphoric acid compounds, hydroxy acids, hydroxy acid salts, sulfur-containing compounds, saponins, organic acids, organic acid salts, inorganic salts and amino acids. These may be used each independently or in an arbitrary combination of two or more species. As the salts referred to above, alkali metal salts such as sodium salts and potassium salts and alkaline earth metal salts such as calcium salts and magnesium salts can be mentioned. The preferred are sodium salts, potassium salts and calcium salts. More particularly, there can be mentioned sodium inosinate, sodium citrate, potassium citrate, calcium citrate, sodium phytate, potassium phytate, calcium phytate, calcium lactate, methionine, arginine hydrochloride, glycyrrhizin, calcium gluconate, sodium gluconate and sodium sulfate.

The level of use of said defined substance relative to sucralose for achieving the thermal stability-enhancing effect of the invention is not particularly restricted but is not less than 0.0001 part by weight, preferably not less than 0.001 part by weight, more preferably not less than 0.01 part by weight, based on each part by weight of sucralose. There is no particular upper limit from the standpoint of the effect of the invention, although the taste of the substance itself and other variables should be taken into consideration.

The substance to be caused to coexist with sucralose as a discoloration inhibitor is not particularly restricted inasmuch as it is liberally chosen from among the specific substances mentioned above. The particularly preferred, among them, are compounds having a purine base as a constituent (nucleosides, nucleotides and salts thereof), organic phosphoric acid compounds, hydroxy acids, hydroxy acid salts, sulfur-containing compounds, saponins, organic acids, organic acid salts, inorganic salts and amino acids. These may be used each independently or in an arbitrary combination of two or more species.

The salts mentioned just above may be alkali metal salts such as sodium salts and potassium salts and alkaline earth metal salts such as calcium salts and magnesium salts with sodium, potassium and magnesium salts being preferred. More particularly, there can be mentioned sodium inosinate, sodium citrate, potassium citrate, calcium citrate, sodium phytate, potassium phytate, calcium phytate, calcium lactate, methionine, arginine hydrochloride, glycyrrhizin, calcium gluconate, sodium gluconate and sodium sulfate.

The formulating amount of said defined substance relative to sucralose for achieving the discoloration inhibitory effect of the invention is not particularly restricted but may for example be not less than 0.001 part by weight, preferably not less than 0.01 part by weight, based on each part by weight of sucralose. There is no particular limitation on the upper limit from the standpoint of insuring the effect of the invention, although the taste of the substance to be used, among other variables, should be taken into consideration.

The above-mentioned method of thermal stabilization and method of inhibiting discoloration are not particularly restricted, either, in the mode of coexistence of sucralose and said substance or the manner in which these ingredients are brought into coexistence. Thus, there can be mentioned the method which comprises blending a powder of sucralsoe with a powder of said substance to give a powdery mixture, the method which comprises spraying a powder or granulation of sucralose with a solution containing at least one species of said defined substance, the method which conversely comprises spraying a solution of said substance over a powder or granulation of sucralose, the method which comprises mix-dispersing sucralose and said defined substance in a liquid medium to prepare a slurry and extruding the dispersion to prepare a granulation, and the method which comprises dissolving sucralose and said defined substance together and drying the solution, as well as the method in which sucralose and said defined substance are added serially or concurrently to the food material in the course of production of the food.

The sucralose as the substrate for thermal stabilization and inhibition of discoloration is not particularly restricted in form or mode of existence but in view of its properties described hereinbefore, sucralose which is expected to exist in moisture-lean condition (e.g. moisture content: ≦20 weight %, particularly ≦15 weight %), for example in a solid state; sucralose which will be exposed to low pH conditions; sucralose which will be exposed to rugged heating conditions; and sucralose which will be subjected to long-term storage at elevated temperature can be mentioned as the preferred examples of sucralose.

In accordance with the invention, by allowing said defined substance to coexist with sucralose, the thermal stability of sucralose can be enhanced to impart sufficient heat resistance so that it may withstand a heat treatment in solid state, under low pH conditions, or under rugged conditions, which would otherwise cause degradation of sweetness and discoloration.

IV. Method of Improving the Sweetness of Sucralose

The defined substance mentioned above, when formulated in combination with sucralose, not only imparts thermalstability (heat resistance) to sucralose but synergistically improves the intensity of sweetness of sucralose as well as the quality of sweetness of sucralose.

The present invention provides a novel use of said defined substance, that is to say the use as a sweetness-improving agent for sucralose, and a method of improving the sweetness of sucralose which comprises causing at least one species of said defined substance to coexist with sucralose.

The substance to be caused to coexist with sucralose as said sweetness-improving agent can also be liberally chosen from among the various specific substances mentioned hereinbefore. The preferred substances, among them, are compounds having a purine base as a constituent (nucleosides, nucleotides and salts thereof), organic phosphoric acid compounds, hydroxy acids, hydroxy acid salts, sulfur-containing compounds, saponins, organic acids, organic acid salts, inorganic salts and amino acids. These may be used each independently or in an arbitrary combination of two or more species. As the salts referred to above, alkali metal salts such as sodium salts and potassium salts and alkaline earth metal salts such as calcium salts and magnesium salts can be mentioned. The preferred salts are sodium salts, potassium salts and calcium salts. More particularly, there can be mentioned sodium inosinate, sodium citrate, potassium citrate, calcium citrate, sodium phytate, potassium phytate, calcium phytate, calcium lactate, methionine, arginine hydrochloride, glycyrrhizin, calcium gluconate, sodium gluconate, and sodium sulfate.

The formulating amount of said defined substance relative to sucralose for achieving the sweetness-improving effect of the invention is not particularly restricted but may for example be not less than 0.001 part by weight, preferably not less than 0.01 part by weight, based on each part by weight of sucralose. There is no particular limitation on the upper limit from the standpoint of insuring the effect of the invention, although the taste of said defined substance to be used, among other variables, should be taken into consideration.

The mode of coexistence of sucralose and said defined substance or the manner in which these ingredients are brought into coexistence is not particularly restricted. Thus, there can be mentioned the method which comprises blending a powder of sucralsoe with a powder of said substance to give a powdery mixture, the method which comprises spraying a powder or granulation of sucralose with a solution containing at least one species of said defined substance, the method which conversely comprises spraying a solution of said substance over a powder or granulation of sucralose, the method which comprises mix-dispersing sucralose and said substance in a liquid medium to prepare a slurry and extruding the dispersion to prepare a granulation, and the method which comprises dissolving sucralose and said defined substance together and drying the solution, as well as the method in which sucralose and said defined substance are added serially or concurrently to the food material in the course of production of the food.

The sucralose whose sweetness is to be improved is not particularly restricted in form or mode of existence: thus it may be in any of solid (powdery, granular, shaped), liquid, semisolid and other forms.

By causing said defined substance to coexist with sucralose in accordance with the invention, the intensity of sweetness of sucralose can be synergistically increased and the quality of sweetness improved at the same time. Therefore, a composition comprising sucralose and said defined substance is of value as a high-sweetness sweetener featuring a good quality of sweetness.

EXAMPLES

The following examples illustrate this invention in further detail but are not intended to define the scope of the invention. It is to be understood that, in the following examples, all parts and % means parts by weight and % by weight, respectively and further that unless otherwise indicated, the formulating amounts of ingredients are expressed in parts by weight.

Example 1

To 1 parts of sucralose (powder) was added sodium inosinate (powder) at the levels indicated in Table 1 and the resulting mixtures were respectively made up to 100 parts with dextrin to give powdery sucralose-containing compositions (powdery mixtures). Each of these compositions was heated in an oven (Perfect Oven; manufactured by Tabai Co.) limited at 120° C. for 1 hour. The sweetness of the resulting sucralose-containing composition was determined to evaluate the thermal stability of sucralose. As control, a sodium inosinate-free composition exclusively composed of sucralose and dextrin was also evaluated for thermal stability.

To evaluate the thermal stability of sucralose, each test sample (sucralose-containing composition) was diluted in water to a suitable concentration depending on its sucralose content and the intensity and quality of sweetness of this aqueous solution were evaluated by an organoleptic test using 20 panelists. The evaluation was made by scoring the degrees of change in the intensity and quality of sweetness from the control values prior to heating of each test sample (unheated control) according to the following scoring scale (the same applies to the following examples unless otherwise indicated).

| | Scoring scale | | | | |
|---|---|---|---|---|---|
| | No change | Slight change | Moderate change | Significant change | Marked change |
| Degree of sweetness | 5 | 4 | 3 | 2 | 1 |
| Quality of sweetness (mild taste) | 5 | 4 | 3 | 2 | 1 |

TABLE 1

| Level of sodium inosinate | Sweetness Intensity | Sweetness Quality |
|---|---|---|
| 0 (control) | 2 | 2 |
| 0.001 (this invention) | 3 | 4 |
| 0.01 (this invention) | 4 | 4 |
| 0.1 (this invention) | 4 | 4 |
| 1 (this invention) | 4 | 4 |

It was found that whereas heating caused significant reductions in both the intensity and quality of sweetness of sucralose in the absence of sodium inosinate, these reductions were significantly inhibited when sodium inosinate was formulated. These results indicated that both the intensity and quality of sweetness of sucralose are remarkably stabilized when sodium inosinate was caused to coexist with sucralose.

Example 2

To 1 part of sucralose (powder) was added 0.1 part of sodium guanylate, sodium adenylate, sodium citidylate or sodium uridylate (all powders), and the mixture was made up to 100 parts with dextrin to give a sucralose-containing composition (powdery mixture). This composition was heated in an oven at 120° C. for 1 hour. Each sucralose-containing composition thus obtained was tested for sweetness as in Example 1 to evaluate the thermal stability of sucralose. As reference control, a composition consisting exclusively of sucralose and dextrin as prepared without formulating any of the above-mentioned nucleotide salts was also evaluated for the thermal stability (no addition control). The results are shown in Table 2.

TABLE 2

| Nucleotide salt | Sweetness Intensity | Sweetness Quality |
|---|---|---|
| No addition (control) | 2 | 2 |
| Sodium guanylate (this invention) | 3 | 4 |
| Sodium adenylate (this invention) | 4 | 4 |
| Sodium citidylate (this invention) | 4 | 4 |
| Sodium uridylate (this invention) | 4 | 3 |

It was found that whereas heating caused significant reductions in the intensity and quality of sweetness of sucralose in the absence of a nucleotide salt, these reductions were remarkably inhibited when any of sodium quanylate, sodium adenylate, sodium citidylate and sodium uridylate was formulated.

The results obtained in Example 1 and Example 2 indicate that both the intensity and quality of sweetness of sucralose can be remarkably stabilized by causing a nucleotide salt, such as the sodium salt of inosinic acid, quanylic acid, adenylic acid, citidylic acid or uridylic acid, to coexist with sucralose.

Example 3

To 1 part of sucralose (powder) was added 0.1 part of hypoxanthine, inosine or sodium inosinate (all powders), and the mixture was made up to 100 parts with dextrin to give a sucralose-containing composition (powdery mixture). This composition was heated in an oven at 120° C. for 1 hour and tested for sweetness to evaluate the thermal stability of sucralose as in Example 1. As reference controls, a comparable composition not containing hypoxanthine (control 1) and a comparable composition containing the sugar moiety (ribose) of the nucleic acid (control 2) in lieu of above substances were also evaluated for thermal stability. The results are shown in Table 3.

TABLE 3

| | Sweetness Intensity | Sweetness Quality |
|---|---|---|
| No addition (control 1) | 2 | 2 |
| Ribose (control 2) | 2 | 2 |
| Hypoxanthine (this invention) | 4 | 3 |
| Inosine (this invention) | 4 | 3 |
| Sodium inosinate (this invention) | 4 | 4 |

Thus, heating caused significant reductions in both the intensity and quality of sweetness of sucralose in the case of no addition (control 1) and these reductions could not be inhibited by formulating ribose which is the sugar moiety of the nucleic acid (control 2). However, when hypoxanthine which is the purine base of a nucleotide, inosine which is a nucleoside having, a purine base, or the sodium salt of inosinic acid which is a nucleotide, said decreases could be remarkably inhibited. These results indicate that the base of a nucleotide, a nucleoside containing the base, and a nucleotide has a marked stabilizing effect on sucralose.

Example 4

To 1 part of sucralose (powder) was added 0.1 part of sodium inosinate (powder), and the mixture was made up to 100 parts with dextrin to give a sucralose-containing composition (powdery mixture). This composition was divided into 3 portions and one of the portions was used as it was as a sucralose-containing composition (powdery mixture), another portion was dissolved in water and spray-dried (spray-dried composition), and the remaining portion was dissolved in water and dried in a drum dryer (drum-dried composition). As control, a sodium inosinate-free sucralose-containing composition was prepared (powdery mixture). Each of these compositions was heated in an oven at 130° C. for 1 hour, and by the procedure described in Example 1, the sweetness of the composition was determined to evaluate the thermal stability of sucralose. The results are shown in Table 4.

TABLE 4

| Classification by process of composition | | |
|---|---|---|
| | Sweetness | |
| | Intensity | Quality |
| Powdery mixture (control: without sodium inosinatel) | 2 | 2 |
| Powdery mixture (this invention) | 4 | 3 |
| Spray-dried composition (this invention) | 5 | 5 |
| Drum-dried composition (this invention) | 4 | 4 |

It was found that regardless of the production process used, formulation of sucralose and sodium inosinate together resulted in a significant inhibition of the thermal degradation of sucralose in terms of the intensity and quality of sweetness so that the composition showed very high thermal stability (resistance to heat). Among the compositions tested, the sucralose-containing composition prepared by the spray-drying process and that prepared by the drum-drying process displayed more outstanding thermal stability.

Example 5

A syrup prepared by blending 100 parts of palatinit, 30 parts of water, 0.2 part of sucralose and 0.016 part of sodium inosinate was boiled down at 150° C. to give a hard candy (a product of the invention). A reference hard candy (control) was also prepared by the same procedure except that sodium inosinate was not formulated. Each of the candies thus obtained was dissolved and diluted in water to a final concentration of 50 weight % solids and the sweetness (intensity, quality) of the resulting syrup was compared with the control 50 weight % dilution of the sodium inosinate-free syrup of otherwise the same composition (unheated) to evaluate the stabilizing effect of sodium inosinate on sucralose against heat. The results are shown in Table 5.

TABLE 5

| | Sweetness | |
|---|---|---|
| | Intensity | Quality |
| Without sodium inosinate (control) | 2 | 2 |
| With sodium inosinate (this invention) | 5 | 5 |

Whereas the hard candy (control) prepared without addition of sodium inosinate showed significant reductions in both the intensity and quality of sweetness, the hard candy prepared with addition of sodium inosinate according to this invention showed no thermal degration of sweetness but retained a very satisfactory sweetness. This result indicates that by causing sodium inosinate, i.e. a nucleotide salt, to coexist with sucralose, the sucralose can be stabilized even against intense heat under moisture-lean conditions, thus being enabled to retain a satisfactory sweetness (intensity and quality).

Example 6

To a composition consisting of 100 parts of soft flour, 45 parts of reduced starch syrup, 0.6 part of sodium bicarbonate, 50 parts of margarine, 10 parts of egg yolk, 0.4 part of flavor and 0.02 part of sucralose was added 0.002 part of sodium guanylate and, after thorough mixing, the resulting batter was spread and baked in an oven at 170° C. for 40 minutes to give a cookie of the invention (this invention). A reference cookie (control) was also prepared in the same manner as above except that sodium guanylate was not formulated. With the intensity and quality of sweetness of the sodium guanyulate-containing cookie thus obtained (this invention) being scored as 5 each, the intensity and quality of sweetness of the sodium guanylate-free cookie (control) were rated to evaluate the stabilizing effect of sodium guanylate on sucralose against heat. The results are shown in Table 6.

TABLE 6

| | Sweetness | |
|---|---|---|
| | Intensity | Quality |
| Without sodium guanylate (control) | 3 | 3 |
| With sodium guanylate (this invention) | 5 | 5 |

Whereas the cookie prepared without addition of sodium guanylate deteriorated in both the intensity and quality of sweetness, the cookie prepared with addition of sodium guanylate according to this invention was found to retain the satisfactory sweetness as expected, indicative of good thermal stability.

Example 7

To 1 part of sucralose (powder) was added quercitrin (powder) at the levels indicated in Table 7, and each mixture was made up to 100 parts with dextrin to give a sucralose-containing composition (powdery mixture). Each of these compositions was heated in an oven at 120° C. for 1 hour and its sweetness was tested as in Example 1 to evaluate the stabilizing effect on sucralose against heat. The results are also shown in Table 7.

TABLE 7

| Level of quercitrin | | |
|---|---|---|
| | Sweetness | |
| | Intensity | Quality |
| 0 (control) | 2 | 2 |
| 0.001 (this invention) | 3 | 4 |
| 0.01 (this invention) | 4 | 4 |
| 0.1 (this invention) | 4 | 4 |
| 1 (this invention) | 4 | 4 |

It was found that whereas heating caused significant reductions in the intensity and quality of sweetness of sucralose in the absence of quercitrin, addition of quercitrin resulted in a significant inhibition of such reductions. These results indicate that by allowing quercitrin to coexist with sucralose, the intensity and quality of sweetness of sucralose can both be remarkably stabilized.

Example 8

To sucralose (powder) was added 0.1 part each of methylhesperidin, red cabbage color (flavonoid color) or beet red (betacyanine color) (all powders), and each mixture was made up to 100 parts with dextrin to give a sucralose-containing composition (powdery mixture). This composition was heated in an oven at 120° C. for 1 hour and its sweetness was determined as in Example 1 to evaluate the thermal stabilizing effect on sucralose. The results are shown in Table 8.

TABLE 8

| | Sweetness | |
|---|---|---|
| | Intensity | Quality |
| No addition (control) | 2 | 2 |
| Methylhesperidin (this invention) | 3 | 4 |
| Beet red (this invention) | 4 | 4 |
| Red cabbage color (this invention) | 4 | 4 |

It was found that whereas heating caused significant reductions in both the intensity and quality of sweetness in the case of no addition, these reductions were significantly inhibited when methylhesperidin, red cabbage color or beet red was formulated.

The results obtained in Examples 7 and 8 indicate that flavonoids and flavonoid glydosides, such as quercitrin, methylhesperidin, red cabbage color, etc. as well as beet red (a betacyanine color) have the property to stabilize both the intensity and quality of sweetness of sucralose (thermal-stabilizing activity, heat resistance-imparting activity).

Example 9

To 1 part of sucralose (powder) was added 0.1 part of myristolein (powder), and the mixture was made up to 100 parts with dextrin to give a sucralose-containing composition (powdery mixture). This composition was divided into 3 portions and one of the portions was used as it was as a sucralose-containing composition (powdery mixture), another portion was dissolved in water and spray-dried (spray-dried composition), and the remaining portion was dissolved in water and dried in a drum dryer (drum-dried composition). As control, a myristolein-free sucralose-containing composition was prepared (powdery mixture). Each of these compositions was heated in an oven at 130° C. for 1 hour, and by the procedure described in Example 1, the sweetness of the composition was determined to evaluate the thermal stability of sucralose. The results are shown in Table 9.

TABLE 9

| Classification by process of composition | Sweetness | |
|---|---|---|
| | Intensity | Quality |
| Powdery mixture (control: without myristolein) | 2 | 2 |
| Powdery mixture (this invention) | 4 | 3 |
| Spray-dried composition (this invention) | 5 | 5 |
| Drum-dried composition (this invention) | 4 | 4 |

It was found that regardless of the production process used, formulation of sucralose and myristolein together resulted in a significant inhibition of the thermal degradation of sucralose in terms of the intensity and quality of sweetness so that the composition showed very high thermal stability (resistance to heat). Among the compositions tested, the sucralose-containing composition prepared by the spray-drying process and that prepared by the drum-drying process displayed more outstanding thermal stability.

Example 10

To 1 part of sucralose (powder) was added tannic acid (powder) at the levels indicated in Table 10, and each mixture was made up to 100 parts with dextrin to give a sucralose-containing composition (powdery mixture). Each of these compositions was heated in an oven at 120° C. for 1 hour and its sweetness was tested as in Example 1 to evaluate the stabilizing effect on sucralose against heat. The results are also shown in Table 10.

TABLE 10

| Level of tannic acid | Sweetness | |
|---|---|---|
| | Intensity | Quality |
| 0 (control) | 2 | 2 |
| 0.001 (this invention) | 3 | 4 |
| 0.01 (this invention) | 4 | 4 |
| 0.1 (this invention) | 4 | 4 |
| 1 (this invention) | 4 | 4 |

It was found that whereas heating caused significant reductions in the intensity and quality of sweetness of sucralose in the absence of tannic acid, addition of tannic acid resulted in a significant inhibition of such reductions. These results indicate that by allowing tannic acid to coexist with sucralose, the intensity and quality of sweetness of sucralose can both be remarkably stabilized.

Example 11

To 1 part of sucralose (powder) was added 0.1 part of gallic acid or coffeic acid (each powder), and the mixture was made up to 100 parts with dextrin to give a sucralose-containing composition (powdery mixture). This composition was heated in an oven at 120° C. for 1 hour and, then, tested for sweetness as in Example 1 to evaluate the thermal stability of sucralose. The results are shown in Table 11.

TABLE 11

| | Sweetness | |
|---|---|---|
| | Intensity | Quality |
| No addition (control) | 2 | 2 |
| Gallic acid (this invention) | 3 | 4 |
| Caffeic acid (this invention) | 4 | 4 |

It was found that whereas heating caused significant reductions in the intensity and quality of sweetness of sucralose in the case of no addition, these reductions were remarkably inhibited when gallic acid or coffeic acid was formulated.

The results obtained in Examples 10 and 11 indicate that polyphenols such as tannic acid, gallic acid and coffeic acid have the property to stabilize both the intensity and quality of sucralose.

Example 12

To 1 part of sucralose (powder) was added 0.1 part of gallic acid (powder), and the mixture was made up to 100 parts with dextrin to give a sucralose-containing composition (powdery mixture). This composition was divided into 3 portions and one of the portions was used as it was as a sucralose-containing composition (powdery mixture), another portion was dissolved in water and spray-dried (spray-dried composition), and the remaining portion was dissolved in water and dried in a drum dryer (drum-dried composition). As control, sucralose-containing composition was prepared by the same procedure except that gallic acid was not formulated (powdery mixture). Each of these compositions was heated in an oven at 130° C. for 1 hour, and by the procedure described in Example 1, the sweetness of the composition was determined to evaluate the thermal stability of sucralose. The results are shown in Table 12.

TABLE 12

| Classification by process of composition | Sweetness | |
|---|---|---|
| | Intensity | Quality |
| Powdery mixture (control: without gallic acid) | 2 | 2 |
| Powdery mixture (this invention) | 4 | 3 |
| Spray-dried composition (this invention) | 5 | 5 |
| Drum-dried composition (this invention) | 5 | 4 |

It was found that regardless of the production process used, formulation of sucralose and gallic acid resulted in a significant inhibition of the thermal degradation of sucralose in terms of the intensity and quality of sweetness so that the composition showed very high thermal stability (resistance to heat). Among the compositions tested, the sucralose-containing composition prepared by the spray-drying process and that prepared by the drum-drying process displayed more outstanding thermal stability.

Example 13

To 1 part of sucralose (powder) was added sodium phytate (powder) at the levels indicated in Table 13 and the resulting mixtures were respectively made up to 100 parts with dextrin to give sucralose-containing powdery compositions (powdery mixtures). Each of these compositions was heated in an oven at 120° C. for 1 hour. The sweetness of the resulting sucralose-containing composition was determined to evaluate the thermal stability of sucralose. The results are shown in Table 13.

TABLE 13

| Level of addition (parts by weight) | Sweetness | |
|---|---|---|
| | Intensity | Quality |
| 0 (control) | 2 | 2 |
| 0.001 (this invention) | 3 | 4 |
| 0.01 (this invention) | 4 | 4 |
| 0.1 (this invention) | 4 | 4 |
| 1 (this invention) | 4 | 4 |

It was found that whereas heating caused significant reductions in the intensity and quality of sweetness of sucralose in the absence of sodium phytate, these decreases were significantly inhibited when sodium phytate was added. The above results indicate that causing sodium phytate to coexist with sucralose results in a marked stabilization of sucralose in terms of the intensity and quality of sweetness.

Example 14

To 1 part of sucralose (powder) was added 0.1 part of sodium glycerophosphate (powder) or sodium riboflavin-phosphate (powder), and the mixture was made up to 100 parts with dextrin to give a sucralose-containing composition (powdery mixture). This composition was heated in an oven at 120° C. for 1 hour and tested for sweetness to evaluate the thermal stability of sucralose as in Example 1. The results are shown in Table 14.

TABLE 14

| | Sweetness | |
|---|---|---|
| | Intensity | Quality |
| No addition (control) | 2 | 2 |
| Sodium glycerophosphate (this invention) | 4 | 4 |
| Sodium riboflavin-phosphate (this invention) | 4 | 3 |

It was found that whereas heating caused significant reductions in the intensity and quality of sucralose in the case of no addition, these reductions were remarkably inhibited when sodium glycerophosphate or sodium riboflavin-phosphate was added.

The results obtained in Examples 13 and 14 indicate that causing sodium phytate or an organic phosphoric acid compound such as sodium glycerophosphate or sodium riboflavin-phosphate results in a marked stabilization of sucralose in terms of the intensity and quality of sweetness.

Example 15

To 1 part of sucralose (powder) was added 0.1 part of sodium glycerophosphate (powder), and the mixture was made up to 100 parts with dextrin to give a sucralose-containing composition (powdery mixture). This composition was divided into 3 portions and one of the portions was used as it was as a sucralose-containing composition (powdery mixture), another portion was dissolved in water and spray-dried (spray-dried composition), and the remaining portion was dissolved in water and dried in a drum dryer (drum-dried composition). As control, a sodium glycerophosphate-free sucralose-containing composition was prepared (powdery mixture). Each of these compositions was heated in an oven at 130° C. for 1 hour, and by the procedure described in Example 1, the sweetness of the composition was determined to evaluate the thermal stability of sucralose. The results are shown in Table 15.

TABLE 15

| Classification by process of composition | Sweetness | |
|---|---|---|
| | Intensity | Quality |
| Powdery mixture (control: without sodium glycerophosphate) | 2 | 2 |
| Powdery mixture (this invention) | 3 | 3 |
| Spray-dried composition (this invention) | 5 | 5 |
| Drum-dried composition (this invention) | 4 | 4 |

It was found that regardless of the production process used, formulation of sucralose and sodium glycerophosphate together resulted in a significant inhibition of the thermal degradation of sucralose in terms of the intensity and quality of sweetness so that the composition showed very high thermal stability (resistance to heat). Among the compositions tested, the sucralose-containing composition prepared by the spray-drying process and that prepared by the drum-drying process displayed more outstanding thermal stability.

Example 16

To 1 part of sucralose (powder) was added 0.1 part of glutathione, cysteine or indigo carmine (all powders), and the mixture was made up to 100 parts with dextrin to give a sucralose-containing composition (powdery mixture). This composition was heated in an oven at 120° C. for 1 hour and, then, tested for sweetness as in Example 1 to evaluate the thermal stability of sucralose. The results are shown in Table 16.

TABLE 16

| | Sweetness | |
|---|---|---|
| | Intensity | Quality |
| No addition (control) | 2 | 2 |
| Glutathione (this invention) | 4 | 4 |
| Cysteine (this invention) | 4 | 3 |
| Indigo carmine (this invention) | 4 | 4 |

It was found that whereas heating caused significant reductions in the intensity and quality of sweetness in the case of no addition, these reductions were significantly inhibited when glutathione, cysteine or indigo carmine was formulated.

Example 17

To 1 part of sucralose (powder) was added 0.1 part of methionine (powder), and the mixture was made up to 100 parts with dextrin to give a sucralose-containing composition (powdery mixture). This composition was divided into 3 portions and one of these portions was used as it was as a sucralose-containing composition (powdery mixture), another portion was dissolved in water and spray-dried (spray-dried composition), and the remaining portion was dissolved in water and dried in a drum dryer (drum-dried composition). As control, a methionine-free sucralose-containing composition was prepared. (powdery mixture). Each of these compositions was heated in an oven at 130° C. for 1 hour, and by the procedure described in Example 1, the sweetness of the composition was determined to evaluate the thermal stability of sucralose. The results are shown in Table 17.

TABLE 17

| Classification by process of composition | Sweetness | |
|---|---|---|
| | Intensity | Quality |
| Powdery mixture (control: without methionine) | 2 | 2 |
| Powdery mixture (this invention) | 3 | 3 |
| Spray-dried composition (this invention) | 5 | 5 |
| Drum-dried composition (this invention) | 4 | 4 |

It was found that regardless of the production process used, formulation of sucralose and methionine together resulted in a significant inhibition of the thermal degradation of sucralose in terms of the intensity and quality of sweetness so that the composition showed very high thermal stability (resistance to heat). Among the compositions tested, the sucralose-containing composition prepared by the spray-drying process and that prepared by the drum-drying process displayed more outstanding thermal stability.

The results obtained in Examples 16, and 17 indicate that sulfur-containing compounds such as glutathione, cysteine, indigo carmine and methionine have the property to stabilize both the intensity and quality of sweetness of sucralose (thermal stabilizing activity, heat resistance-imparting activity).

Example 18

To 1 part of sucralose (powder) was added calcium lactate (powder) at the levels indicated in Table 18, and each mixture was made up to 100 parts with dextrin to give a sucralose-containing composition (powdery mixture). This composition was heated in an oven at 120° C. for 1 hour and, then, tested for sweetness as in Example 1 to evaluate the thermal stability of sucralose. The results are shown in Table 18.

TABLE 18

| Level of addition (parts by weight) | Sweetness | |
|---|---|---|
| | Intensity | Quality |
| 0 (control) | 2 | 2 |
| 0.001 (this invention) | 3 | 4 |
| 0.01 (this invention) | 4 | 4 |
| 0.1 (this invention) | 4 | 4 |
| 1 (this invention) | 4 | 4 |

It was found that whereas heating caused significant reductions in the intensity and quality of sweetness of sucralose in the absence of calcium lactate, these reductions were significantly inhibited when calcium lactate was formulated. The above results indicate that by causing calcium lactate to coexist with sucralose, the intensity and quality of sweetness of sucralose can both be remarkably stabilized.

Example 19

To 1 part of sucralose (powder) was added 0.1 part of sodium gluconate, sodium tartrate, sodium malate, or sodium citrate (all powders), and the mixture was made up to 100 parts with dextrin to give a sucralose-containing composition (powdery mixture). This composition was heated in an oven at 120° C. for 1 hour and, then, tested for sweetness as in Example 1 to evaluate the thermal stability of sucralose. The results are shown in Table 19.

TABLE 19

| | Sweetness | |
|---|---|---|
| | Intensity | Quality |
| No addition (control) | 2 | 2 |
| Sodium gluconate (this invention) | 4 | 4 |
| Sodium tartrate (this invention) | 4 | 3 |
| Sodium malate (this invention) | 4 | 4 |
| Sodium citrate (this invention) | 3 | 3 |

It was found that whereas heating caused significant reductions in the intensity and quality of sweetness of sucralose in the case of no addition, these decreases were remarkably inhibited when the sodium salt of gluconic acid, tartaric acid, malic acid or citric acid was formulated.

The results obtained in Examples 18 and 19 indicate that by causing the salt of a hydroxyl acid such as lactic acid, gluconic acid, tartaric acid, malic acid or citric acid to coexist with sucralose, the intensity and quality of sweetness of sucralose can be remarkably stabilized.

Example 20

To 1 part of sucralose was added 0.1 part of sodium lactate, and the mixture was made up to 100 parts with dextrin to give a sucralose-containing composition (powdery mixture). This composition was divided into 3 portions and one of the portions was used as it was as a sucralose-containing composition (powdery mixture) another portion was dissolved in water and spray-dried (spray-dried composition), and the remaining portion was dissolved in water and dried in a drum dryer (drum-dried composition). As control, a sodium lactate-free sucralose-containing composition was prepared (powdery mixture). Each of these compositions was heated in an oven at 130° C. for 1 hour, and by the procedure described in Example 1, the sweetness of the composition was determined to evaluate the thermal stability of sucralose. The results are shown in Table 20.

TABLE 20

| Classification by process of composition | Sweetness | |
|---|---|---|
| | Intensity | Quality |
| Powdery mixture (control: without sodium lactate) | 2 | 2 |
| Powdery mixture (this invention) | 3 | 3 |
| Spray-dried composition (this invention) | 5 | 5 |
| Drum-dried composition (this invention) | 4 | 4 |

It was found that regardless of the production process used, formulation of sucralose and sodium lactate together resulted in a significant inhibition of the thermal degradation of sucralose in terms of the intensity and quality of sweetness so that the composition showed very high thermal stability (resistance to heat). Among the compositions tested, the sucralose-containing composition prepared by the spray-drying process and that prepared by the drum-drying process displayed more outstanding thermal stability.

Example 21

To 1 part of sucralose was added sesamol at the levels indicated in Table 21, and each mixture was made up to 100 parts with dextrin to give a sucralose-containing composition (powdery mixture). This composition was heated in an oven at 120° C. for 1 hour and, then, tested for sweetness as in Example 1 to evaluate the thermal stability of sucralose. The results are shown in Table 21.

TABLE 21

| Level of addition (parts by weight) | Sweetness | |
|---|---|---|
| | Intensity | Quality |
| 0 (control) | 2 | 2 |
| 0.001 (this invention) | 3 | 4 |
| 0.01 (this invention) | 4 | 4 |
| 0.1 (this invention) | 4 | 4 |
| 1 (this invention) | 4 | 4 |

It was found that whereas heating caused significant reductions in the intensity and quality of sweetness of sucralose in the absence of sesamol, these reductions were significantly inhibited when sesamol was formulated. The above results indicate that by causing sesamol to coexist with sucralose, the intensity and quality of sweetness of sucralose can both be remarkably stabilized.

Example 22

To 1 part of sucralose (powder) was added 0.1 part of sesamin or sesaminol (all powders), and the mixture was made up to 100 parts with dextrin to give a sucralose-containing composition (powdery mixture). This composition was heated in an oven at 120° C. for 1 hour and, then, tested for sweetness as in Example 1 to evaluate the thermal stability of sucralose. The results are shown in Table 22.

TABLE 22

| | Sweetness | |
|---|---|---|
| | Intensity | Quality |
| No addition (control) | 2 | 2 |
| Sesamin (this invention) | 4 | 4 |
| Sesaminol (this invention) | 4 | 3 |

It was found that whereas heating caused significant reductions in the intensity and quality of sweetness of sucralose in the case of no addition, these reductions were remarkably inhibited when the sesamin or sesaminol was formulated.

The results obtained in Examples 21 and 22 indicate that by causing a lignan such as sesamol, sesamin or sesaminol to coexist with sucralose, both the intensity and quality of sweetness of sucralose can be remarkably stabilized.

Example 23

To 1 part of sucralose was added carotene (powder) at the levels indicated in Table 23, and each mixture was made up to 100 parts with dextrin to give a sucralose-containing composition (powdery mixture). This composition was heated in an oven at 120° C. for 1 hour and, then, tested for sweetness as in Example 1 to evaluate the thermal stability of sucralose. The results are shown in Table 23.

TABLE 23

| Level of addition (parts by weight) | Sweetness | |
|---|---|---|
| | Intensity | Quality |
| 0 (control) | 2 | 2 |
| 0.001 (this invention) | 3 | 4 |
| 0.01 (this invention) | 4 | 4 |
| 0.1 (this invention) | 4 | 4 |
| 1 (this invention) | 4 | 4 |

It was found that whereas heating caused significant reductions in the intensity and quality of sweetness of sucralose in the absence of carotene, these reductions were significantly inhibited when carotene was formulated. The above results indicate that by causing carotene to coexist with sucralose, the intensity and quality of sweetness of sucralose can both be remarkably stabilized.

Example 24

To 1 part of sucralose (powder) was added 0.1 part of lycopene or gardenia yellow (all powders), and the mixture was made up to 100 parts with dextrin to give a sucralose-containing composition (powdery mixture). This composition was heated in an oven at 120° C. for 1 hour and, then, tested for sweetness as in Example 1 to evaluate the thermal stability of sucralose. The results are shown in Table 24.

TABLE 24

| | Sweetness | |
|---|---|---|
| | Intensity | Quality |
| No addition (control) | 2 | 2 |
| Lycopene (this invention) | 4 | 4 |
| Gardenia yellow (this invention) | 4 | 3 |

It was found that whereas heating caused significant reductions in both the intensity and quality of sweetness of sucralose in the case of no addition, these decreases were remarkably inhibited when the lycopene or gardenia yellow was formulated.

The results obtained in Examples 23 and 24 indicate that by causing a carotenoid or a glycoside thereof, such as carotene, lycopene or gardenia yellow, to coexist with sucralose, both the intensity and quality of sweetness of sucralose could be remarkably stabilized.

Example 25

To 1 part of sucralose (powder) was added 0.1 part of carotene (powder), and the mixture was made up to 100 parts with dextrin to give a sucralose-containing composition (powdery mixture). This composition was divided into 3 portions and one of these portions was used as it was as a sucralose-containing composition (powdery mixture), another portion was dissolved in water and spray-dried (spray-dried composition), and the remaining portion was dissolved in water and dried in a drum dryer (drum-dried composition). As control, a carotene-free sucralose-containing composition was prepared (powdery mixture). Each of these compositions was heated in an oven at 130° C. for 1 hour, and by the procedure described in Example 1, the sweetness of the composition was determined to evaluate the thermal stability of sucralose. The results are shown in Table 25.

TABLE 25

| Classification by process of composition | Sweetness | |
|---|---|---|
| | Intensity | Quality |
| Powdery mixture (control: without carotene) | 2 | 2 |
| Powdery mixture (this invention) | 3 | 3 |
| Spray-dried composition (this invention) | 5 | 5 |
| Drum-dried composition (this invention) | 4 | 4 |

It was found that regardless of the production process used, formulation of sucralose and carotene together resulted in a significant inhibition of the thermal degradation of sucralose in terms of the intensity and quality of sweetness so that the composition showed very high thermal stability (resistance to heat). Among the compositions tested, the sucralose-containing composition prepared by the spray-drying process and that prepared by the drum-drying process displayed more outstanding thermal stability.

Example 26

To 1 part of sucralose was added adl-α-tocopherol powder (adjusted to 50 in dextrin; product of San-Ei Gen F.F.I., Co.) at the levels indicated in Table 26, and the mixture was made up to 100 parts with dextrin to give a sucralose-containing composition (powdery mixture). This composition was heated in an oven at 120° C. for 1 hour and, then, tested for sweetness to evaluate the thermal stability of sucralose. The results are shown in Table 26.

TABLE 26

| Level of addition (parts by weight) | Sweetness | |
|---|---|---|
| | Intensity | Quality |
| 0 (control) | 2 | 2 |
| 0.001 (this invention) | 3 | 4 |
| 0.01 (this invention) | 4 | 4 |
| 0.1 (this invention) | 4 | 4 |
| 1 (this invention) | 4 | 4 |

It was found that whereas heating caused significant reductions in the intensity and quality of sweetness of sucralose in the absence of tocopherol, these reductions were significantly inhibited when tocopherol was formulated. The above results indicate that by causing tocopherol to coexist with sucralose, the intensity and quality of sweetness of sucralose can both be remarkably stabilized.

Example 27

To 1 part of sucralose (powder) was added 0.1 part of a d-β-tocopherol powder or a d-γ-tocopherol powder (each adjusted to 50% in dextrin; both products of San-Ei Gen F.F.I., Co.), and the mixture was made up to 100 parts with dextrin to give a sucralose-containing composition (powdery mixture). This composition was heated in an oven at 120° C. for 1 hour and, then, tested for sweetness as in Example 1 to evaluate the thermal stability of sucralose. The results are shown in Table 27.

TABLE 27

| | Sweetness | |
|---|---|---|
| | Intensity | Quality |
| No addition (control) | 2 | 2 |
| d-β-tocopherol (this invention) | 4 | 4 |
| d-γ-tocopherol (this invention) | 4 | 3 |

It was found that whereas heating caused significant reductions in the intensity and quality of sweetness of sucralose in the case of no addition, these reductions were remarkably inhibited when β-tocopherol or γ-tocopherol was formulated.

The results obtained in Examples 27 and 28 indicate that by causing tocopherol, such as α-, β- or γ-tocopherol, to coexist with sucralose, the intensity and quality of sweetness of sucralose can both be remarkably stabilized.

Example 28

To 1 part of sucralose (powder) was added 0.1 part of a d1-tocopherol acetate powder (adjusted to 50% in dextrin; product of SanEigen FFI Co.), and the mixture was made up to 100 parts with dextrin to give a sucralose-containing composition (powdery mixture). This composition was divided into 3 portions and one of the portions was used as it was as a sucralose-containing composition (powdery mixture), another portion was dissolved in water and spray-dried (spray-dried composition), and the remaining portion was dissolved in water and dried in a drum dryer (drum-dried composition). As control, a tocopherol-free sucralose-containing composition was prepared (powdery mixture). Each of these compositions was heated in an oven at 130° C. for 1 hour, and by the procedure described in Example 1, the sweetness of the composition was determined to evaluate the thermal stability of sucralose. The results are shown in Table 28.

TABLE 28

| Classification by process of composition | Sweetness | |
|---|---|---|
| | Intensity | Quality |
| Powdery mixture (control: without tocopherol) | 2 | 2 |
| Powdery mixture (this invention) | 3 | 3 |
| Spray-dried composition (this invention) | 5 | 5 |
| Drum-dried composition (this invention) | 4 | 4 |

It was found that regardless of the production process used, formulation of sucralose and tocopherol together resulted in a significant inhibition of the thermal degradation of sucralose in terms of the intensity and quality of sweetness so that the composition showed very high thermal stability (resistance to heat). Among the compositions tested, the sucralose-containing composition prepared by the spray-drying process and that prepared by the drum-drying process displayed more outstanding thermal stability.

Example 29

To 1 part of sucralose (powder) was added glycyrrhizin (powder) at the levels indicated in Table 29, and the mixture was made up to 100 parts with dextrin to give a sucralose-containing composition (powdery mixture). This composition was heated in an oven at 120° C. for 1 hour and, then, tested for sweetness as in Example 1 to evaluate the thermal stability of sucralose. The results are shown in Table 29.

TABLE 29

| Level of addition (parts by weight) | Sweetness | |
|---|---|---|
| | Intensity | Quality |
| 0 (control) | 2 | 2 |
| 0.001 (this invention) | 3 | 4 |
| 0.01 (this invention) | 4 | 4 |
| 0.1 (this invention) | 4 | 4 |
| 1 (this invention) | 4 | 4 |

It was found that whereas heating caused significant reductions in the intensity and quality of sweetness of sucralose in the absence of glycyrrhizin, these reductions were significantly inhibited when glycyrrhizin was formulated. The above results indicate that by causing glycyrrhizin, which is a saponin, to coexist with sucralose, the intensity and quality of sweetness of sucralose can both be remarkably stabilized.

Example 30

To 1 part of sucralose (powder) was added sodium succinate (powder) at the levels indicated in Table 30, and the mixture was made up to 100 parts with dextrin to give a sucralose-containing composition (powdery mixture). This composition was heated in an oven at 120° C. for 1 hour and, then, tested for sweetness as in Example 1 to evaluate the thermal stability of sucralose. The results are shown in Table 30.

TABLE 30

| Level of addition (parts by weight) | Sweetness | |
|---|---|---|
| | Intensity | Quality |
| 0 (control) | 2 | 2 |
| 0.001 (this invention) | 3 | 4 |
| 0.01 (this invention) | 4 | 4 |
| 0.1 (this invention) | 4 | 4 |
| 1 (this invention) | 4 | 4 |

It was found that whereas heating caused significant reductions in the intensity and quality of sweetness of sucralose in the absence of sodium succinate, these reductions were significantly inhibited when sodium succinate was formulated. The above results indicate that by causing sodium succinate to coexist with sucralose, both the intensity and quality of sweetness of sucralose can be remarkably stabilized.

Example 31

To 1 part of sucralose (powder) was added 0.1 part of sodium acetate or sodium fumarate (both powders), and the mixture was made up to 100 parts with dextrin to give a sucralose-containing composition (powdery mixture). This composition was heated in an oven at 120° C. for 1 hour and, then, tested for sweetness as in Example 1 to evaluate the thermal stability of sucralose. The results are shown in Table 31.

TABLE 31

| | Sweetness | |
|---|---|---|
| | Intensity | Quality |
| No addition (control) | 2 | 2 |
| Sodium acetate (this invention) | 3 | 3 |
| Sodium fumarate (this invention) | 4 | 3 |

It was found that whereas heating caused significant reductions in the intensity and quality of sweetness of sucralose in the case of no addition, these reductions were remarkably inhibited when sodium acetate or sodium fumarate was formulated.

The results obtained in Examples 30 and 31 indicate that by causing the sodium salt of an organic acid such as succinic acid, acetic acid or fumaric acid to coexist with sucralose, both the intensity and quality of sweetness of sucralose could be remarkably stabilized.

Example 32

To 1 part of sucralose (powder) was added 0.1 part of sodium acetate (powder), and the mixture was made up to 100 parts with dextrin to give a sucralose-containing composition (powdery mixture). This composition was divided into 3 portions and one of these portions was used as it was as a sucralose-containing composition (powdery mixture), another portion was dissolved in water and spray-dried (spray-dried composition), and the remaining portion was dissolved in water and dried in a drum dryer (drum-dried composition). As control, sodium acetate-free sucralose-containing composition was prepared (powdery mixture). Each of these compositions was heated in an oven at 130° C.

for 1 hour, and by the procedure described in Example 1, the sweetness of the composition was determined to evaluate the thermal stability of sucralose. The results are shown in Table 32.

TABLE 32

| Classification by process of composition | Sweetness Intensity | Sweetness Quality |
|---|---|---|
| Powdery mixture (control: without sodium acetate) | 2 | 2 |
| Powdery mixture (this invention) | 3 | 3 |
| Spray-dried composition (this invention) | 4 | 5 |
| Drum-dried composition (this invention) | 4 | 3 |

It was found that regardless of the production process used, formulation of sucralose and sodium acetate together resulted in a significant inhibition of the thermal degradation of sucralose in terms of the intensity and quality of sweetness so that the composition showed very high thermal stability (resistance to heat). Among the compositions tested, the sucralose-containing composition prepared by the spray-drying process and that prepared by the drum-drying process displayed more outstanding thermal stability.

Example 33

To 1 part of sucralose (powder) was added 0.05 part of disodium hydrogenphosphate (powder), and the mixture was made up to 100 parts with dextrin to give a sucralose-containing composition (powdery mixture). This composition was divided into 3 portions and one of these portions was used as it was as a sucralose-containing composition (powdery mixture), another portion was dissolved in water and spray-dried (spray-dried composition), and the remaining portion was dissolved in water and dried in a drum dryer (drum-dried composition). As control, a disodium hydrogenphosphate-free sucralose-containing composition was prepared (powdery mixture). Each of these compositions was heated in an oven at 130° C. for 1 hour, and by the procedure described in Example 1, the sweetness of the composition was determined to evaluate the thermal stability of sucralose. The results are shown in Table 33.

TABLE 33

| Classification by process of composition | Sweetness Intensity | Sweetness Quality |
|---|---|---|
| Powdery mixture (control: without disodium hydrogenphosphate) | 2 | 2 |
| Powdery mixture (this invention) | 3 | 3 |
| Spray-dried composition (this invention) | 4 | 5 |
| Drum-dried composition (this invention) | 4 | 4 |

It was found that regardless of the production process used, formulation of sucralose and disodium hydrogenphosphate, which is an inorganic acid salt, together resulted in a significant inhibition of the thermal degradation of sucralose in terms of the intensity and quality of sweetness so that the composition showed very high thermal stability (resistance to heat). Among the compositions tested, the sucralose-containing composition prepared by the spray-drying process and that prepared by the drum-drying process displayed more outstanding thermal stability.

Example 34

To 1 part of sucralose (powder) was added 0.05 part of arginine hydrochloride (powder), and the mixture was made up to 100 parts with dextrin to give a sucralose-containing composition (powdery mixture). This composition was divided into 3 portions and one of these portions was used as it was as a sucralose-containing composition (powdery mixture), another portion was dissolved in water and spray-dried (spray-dried composition), and the remaining portion was dissolved in water and dried in a drum dryer (drum-dried composition). As control, an arginine hydrochloride-free sucralose-containing composition was prepared (powdery mixture). Each of these compositions was heated in an oven at 130° C. for 1 hour, and by the procedure described in Example 1, the sweetness of the composition was determined to evaluate the thermal stability of sucralose. The results are shown in Table 34.

TABLE 34

| Classification by process of composition | Sweetness Intensity | Sweetness Quality |
|---|---|---|
| Powdery mixture (control: without arginine hydrochloride) | 2 | 2 |
| Powdery mixture (this invention) | 3 | 3 |
| Spray-dried composition (this invention) | 5 | 4 |
| Drum-dried composition (this invention) | 4 | 4 |

It was found that regardless of the production process used, formulation of sucralose and arginine hydrochloride, which is an amino acid salt, together resulted in a significant inhibition of the thermal degradation of sucralose in terms of the intensity and quality of sweetness so that the composition showed very high thermal stability (resistance to heat). Among the compositions tested, the sucralose-containing composition prepared by the spray-drying process and that prepared by the drum-drying process displayed more outstanding thermal stability.

Example 35

To 10 parts of sucralose (powder) was added 0.5 part of disodium hydrogenphosphate (powder), and 0.5 part of either arginine hydrochloride or sodium inosinate (each powder) was further formulated as shown in Table 35. Each mixture was made up to 100 parts with palatinit to give a sucralose-containing composition (powdery mixture). Each of the compositions thus obtained was heated in an oven at 100° C. for 1 hour and, then, tested for sweetness as in Example 1 to evaluate the thermal stability of sucralose. As control, a composition exclusively consisting of sucralose and palatinit was also evaluated for thermal stability in the same manner. The results are shown in Table 35.

TABLE 35

| Components | Sweetness Intensity | Sweetness Quality |
|---|---|---|
| Sucralose + palatinit (control) | 2 | 2 |
| Sucralose + $Na_2HPO_4$ + palatinit (this invention) | 3 | 3 |
| Sucralose + $Na_2HPO_4$ + arginine HCl + palatinit (this invention) | 5 | 4 |
| Sucralose + $Na_2HPO_4$ + sodium inosinate + palatinit (this invention) | 4 | 5 |

It was found that whereas heating caused significant reductions in the intensity and quality of sweetness of sucralose when only palatinit had been formulated, these reductions were significantly inhibited when disodium hydrogenphosphate was added. This thermal stabilizing effect of disodium hydrogenphosphate on sucralose was potentiated by the concomitant formulation of arginine hydrochloride or sodium inosinate, which resulted in a marked stabilization of sucralose in both the intensity and quality of sweetness.

Example 36

To 1 part of sucralose (powder) was added caffeine (powder) at the levels indicated in Table 36, and each mixture was made up to 100 parts with dextrin to give a sucralose-containing composition (powdery mixture). This composition was heated in an oven at 100° C for 1 hour and, then, tested for sweetness as in Example 1 to evaluate the thermal stability of sucralose. The results are shown in Table 36.

TABLE 36

| Level of addition | Sweetness | |
|---|---|---|
| (parts by weight) | Intensity | Quality |
| 0 (control) | 2 | 2 |
| 0.001 (this invention) | 3 | 3 |
| 0.01 (this invention) | 4 | 3 |
| 0.1 (this invention) | 4 | 4 |
| 1 (this invention) | 4 | 3 |
| 3 (this invention) | 4 | 4 |

It was found that whereas heating caused significant reductions in the intensity and quality of sweetness of sucralose in the absence of caffeine, these reductions were significantly inhibited when caffeine was formulated. The above results indicate that by causing caffeine to coexist with sucralose, the intensity and quality of sweetness of sucralose can both be remarkably stabilized.

Example 37

To 1 part of sucralose (powder) was added 0.1 part of nicotinamide (powder), and the mixture was made up to 100 parts with dextrin to give a sucralose-containing composition (powdery mixture). This composition was divided into 3 portions and one of the portions was used as it was as a sucralose-containing composition (powdery mixture), another portion was dissolved in water and spray-dried (spray-dried composition), and the remaining portion was dissolved in water and dried in a drum dryer (drum-dried composition). As control, a nicotinamide-free sucralose-containing composition was prepared (powdery mixture). Each of these compositions was heated in an oven at 110° C. for 1 hour, and by the procedure described in Example 1, the sweetness of the composition was determined to evaluate the thermal stability of sucralose. The results are shown in Table 37.

TABLE 37

| Classification by process | Sweetness | |
|---|---|---|
| of composition | Intensity | Quality |
| Powdery mixture (control: without nicotinamide) | 2 | 2 |
| Powdery mixture (this invention) | 3 | 3 |
| Spray-dried composition (this invention) | 4 | 4 |
| Drum-dried composition (this invention) | 4 | 4 |

It was found that regardless of the production process used, formulation of sucralose and nicotinamide together resulted in a significant inhibition of the thermal degradation of sucralose in terms of the intensity and quality of sweetness so that the composition showed very high thermal stability (resistance to heat). Among the compositions tested, the sucralose-containing composition prepared by the spray-drying process and that prepared by the drum-drying process displayed more outstanding thermal stability.

The results obtained in Examples 36 and 37 indicate that by causing a basic substance, such as caffeine or nicotinamide, to coexist with sucralose, the intensity and quality of sweetness of sucralose can both be remarkably stabilized.

Example 38

To 10 parts of sucralose (powder) was added 1 part of nicotinamide (powder), and 1 part of either calcium lactate or sodium inosinate (each powder) was further formulated as shown in Table 38. Each mixture was made up to 100 parts with palatinit to give a sucralose-containing composition (powdery mixture). Each of the compositions thus obtained was heated in an oven at 100° C. for 1 hour and, then, tested for sweetness as in Example 1 to evaluate the thermal stability of sucralose. As control, a composition exclusively consisting of sucralose and palatinit was also tested for thermal stability in the same manner. The results are shown in Table 38.

TABLE 38

| | Sweetness | |
|---|---|---|
| Components | Intensity | Quality |
| Sucralose + palatinit (control) | 2 | 2 |
| Sucralose + nicotinamide + palatinit (this invention) | 4 | 3 |
| Sucralose + nicotinamide + calcium lactate + palatinit (this invention) | 5 | 4 |
| Sucralose + nicotinamide + sodium inosinate + palatinit (this invention) | 5 | 4 |

It was found that whereas heating caused significant reductions in the intensity and quality of sweetness of sucralose in the case where only palatinit was formulated, these reductions were significantly inhibited when nicotinamide was added. This thermal stabilizing effect of nicotinamide on sucralose was potentiated by the concomitant formulation of calcium lactate or sodium inosinate, which resulted in a marked stabilization of sucralose in both the intensity and quality of sweetness.

Example 39

To 1 part of sucralose (powder) was added EDTA disodium (powder) at the levels indicated in Table 39, and each mixture was made up to 100 parts with dextrin to give a sucralose-containing composition (powdery mixture). This composition was heated in an oven at 100° C. for 1 hour and, then, tested for sweetness as in Example 1 to evaluate the thermal stability of sucralose. The results are shown in Table 39.

TABLE 39

| Level of addition (parts by weight) | Sweetness Intensity | Quality |
|---|---|---|
| 0 (control) | 2 | 2 |
| 1 (this invention) | 4 | 3 |
| 3 (this invention) | 4 | 4 |

It was found that whereas heating caused significant reductions in the intensity and quality of sweetness of sucralose in the absence of EDTA disodium, these reductions were significantly inhibited when EDTA disodium was formulated. The above results indicate that by causing a chelating agent such as EDTA disodium to coexist with sucralose, the intensity and quality of sweetness of sucralose can both be considerably stabilized.

Example 40

To 1 part of sucralose (powder) was added melanoidin (powder) at the levels indicated in Table 40, and each mixture was made up to 100 parts with dextrin to give a sucralose-containing composition (powdery mixture) These compositions were heated in an oven at 100° C. for 1 hour and, then, tested for sweetness as in Example 1 to evaluate the thermal stability of sucralose. The results are shown in Table 40.

TABLE 40

| Level of addition (parts by weight) | Sweetness Intensity | Quality |
|---|---|---|
| 0 (control) | 2 | 2 |
| 1 (this invention) | 4 | 4 |
| 3 (this invention) | 4 | 4 |

It was found that whereas heating caused significant reductions in the intensity and quality of sweetness of sucralose in the absence of melanoidine, these reductions were significantly inhibited when melanoidine was formulated. The above results indicate that by causing melanoidine to coexist with sucralose, the intensity and quality of sweetness of sucralose can both be remarkably stabilized.

Example 41

To 1 part of sucralose (powder) was added glucoreducton (powder) at the levels indicated in Table 41, and each mixture was made up to 100 parts with dextrin to give a sucralose-containing composition (powdery mixture). This composition was heated in an oven at 100° C. for 1 hour and, then, tested for sweetness as in Example 1 to evaluate the thermal stability of sucralose. The results are shown in Table 41.

TABLE 41

| Level of addition (parts by weight) | Sweetness Intensity | Quality |
|---|---|---|
| 0 (control) | 2 | 2 |
| 1 (this invention) | 4 | 4 |
| 3 (this invention) | 4 | 4 |

It was found that whereas heating caused significant reductions in the intensity and quality of sweetness of sucralose in the absence of glucoreducton, these reductions were significantly inhibited when glucoreducton was formulated. The above results indicate that by causing a reducton such as glucoreducton to coexist with sucralose, the intensity and quality of sweetness of sucralose can both be remarkably stabilized.

Example 42

To 1 part of sucralose (powder) was added phosphatidylcholine (powder) at the levels indicated in Table 42, and each mixture was made up to 100 parts with dextrin to give a sucralose-containing composition (powdery mixture). This composition was heated in an oven at 100° C for 1 hour and, then, tested for sweetness as in Example 1 to evaluate the thermal stability of sucralose. The results are shown in Table 42.

TABLE 42

| Level of addition (parts by weight) | Sweetness Intensity | Quality |
|---|---|---|
| 0 (control) | 2 | 2 |
| 1 (this invention) | 4 | 4 |
| 3 (this invention) | 4 | 4 |

It was found that whereas heating caused significant reductions in the intensity and quality of sweetness of sucralose in the absence of phosphatidylcholine, these reductions were significantly inhibited when phosphatidylcholine was formulated. The above results indicate that by causing a phospholipid such as phosphatidylcholine to coexist with sucralose, the intensity and quality of sweetness of sucralose can both be remarkably stabilized.

Example 43

To 1 part of sucralose (powder) was added butylhydroxyanisole (BHA) (powder) at the levels indicated in Table 43 and each mixture was made up to 100 parts with dextrin to give a sucralose-containing composition (powdery mixture). This composition was heated in an oven at 100° C. for 1 hour and, then, tested for sweetness as in Example 1 to evaluate the thermal stability of sucralose. The results are shown in Table 43.

TABLE 43

| Level of addition (parts by weight) | Sweetness Intensity | Quality |
|---|---|---|
| 0 (control) | 2 | 2 |
| 1 (this invention) | 4 | 4 |
| 3 (this invention) | 4 | 4 |

It was found that whereas heating caused significant reductions in the intensity and quality of sweetness of sucralose in the absence of BHA, these reductions were significantly inhibited when BHA was formulated. The above results indicate that by causing BHA to coexist with sucralose, the intensity and quality of sweetness of sucralose can both be remarkably stabilized.

Example 44

As shown in Table 44, gallic acid (5 parts) and/or calcium lactate (5 parts) (a total of 10 parts in combination use) was added to 1 part of sucralose and the mixture was made up to 100 parts with dextrin to give a sucralose-containing composition (powdery mixture). This composition was stored at 40° C. for 6 months and, then, tested for sweetness as in Example 1 to evaluate the storage stability (shelf life) of sucralose. The results are shown in Table 44.

TABLE 44

| | Sweetness | |
|---|---|---|
| | Intensity | Quality |
| No addition (control) | 2 | 2 |
| Gallic acid (this invention) | 3 | 3 |
| Calcium lactate (this invention) | 3 | 4 |
| Gallic acid + calcium lactate (this invention) | 4 | 5 |

Whereas the 6-month-long storage at 40° C. caused significant reductions in both the intensity and quality of sweetness of sucralose in the case of no addition, these reductions were significantly inhibited when gallic acid or calcium lactate was added. It was also found that the intensity and quality of sweetness of sucralose could both be more remarkably stabilized by using the above-mentioned two formulating agents in combination.

Example 45

One part of sucralose (powder) was blended with sodium inosinate, protein hydrolysate, sodium glutamate, tartaric acid or sodium chloride (each powder) in the ratio indicated in Table 45 to give a sucralose-containing composition (powdery mixture) A 15 g portion of each composition thus obtained was taken in a polyethylene bag and stored at 60° C. under monitoring for change in appearance. As control, the same test was performed on sucralose alone. The results are also shown in Table 45.

TABLE 45

| | Storage at 60° C. | | |
|---|---|---|---|
| | 3 Days | 6 Days | 12 Days |
| Sucralose alone + | ++ | +++ | +++ |
| sodium inosinate (1:0.6) + | − | + | ++ |
| protein hydrolysate* (1:5) + | + | + | + |
| sodium glutamate (1:10) + | + | + | ++ |
| tartaric acid (1:0.6) + | + | + | ++ |
| sodium chloride (1:10) | + | + | ++ |

*Protein hydrolysate: casein peptide (trade name: Glutarome, product of Grenou (Germany))
<Evaluation Criteria>
−: No discoloration
+: Slight discoloration
++: Definite discoloration
+++: Substantial discoloration It will be apparent from the above results that whereas sucralose used alone had already been discolored after 3 days of storage at 60° C. and severely discolored after 6 days, the discoloration of the composition of the invention had been significantly inhibited even after 6 days of storage. These findings indicate that when sucralose is used in combination with sodium inosinate, protein hydrolysate, sodium glutamate, tartaric acid or sodium chloride, the stability of sucralose is improved so that its discoloration can be significantly inhibited even under long-term storage at elevated temperature.

Incidentally when sucralose as such and the above-mentioned various compositions were stored at 25° C. for 12 days, invariably no discoloration was observed.

Example 46

Hard Candy

One-hundred (100) parts of palatinit was mixed with 30 parts of water under stirring and the mixture was boiled down by heating under reduced pressure (degree of vacuum 14.6 kPa) at 150° C. After the pressure reduction was stopped, 0.1 part of sucralose and 0.02 part of one of the substances indicated in Table 46 were added and the whole mixture was maintained at atmospheric pressure under heating at 140° C. The resulting syrup was serially sampled at 0, 10, 20, 30 and 60 minutes and each sample was molded using a disk-shaped die to prepare a hard candy weighing 3 g per piece. Each of the hard candies prepared in the above manner was subjected to an organoleptic evaluation using a panel of 20 tasters for the intensity and quality of sweetness to assess the thermal stability of sucralose. This evaluation of thermal stability was made using the sweetness (intensity, quality) score of the control candy sample at 140° C.×0 min. as 5 and rating the change in sweetness according to the criteria given below. In this connection, there was no gustatory difference between controls. The results are shown in Table 46. In Table 46, / signifies "the intensity/quality of sweetness".

| | Unchanged | Slightly changed | Somewhat changed | Moderately changed | Definitely changed |
|---|---|---|---|---|---|
| Intensity of sweetness | 5 | 4 | 3 | 2 | 1 |
| Quality of sweetness (mild feel) | 5 | 4 | 3 | 2 | 1 |

TABLE 46

| | 140° C. holding time (min.) | | | | |
|---|---|---|---|---|---|
| Substance used in combination with sucralose | 0 | 10 | 20 | 30 | 60 |
| Trisodium citrate | 5/5 | 5/5 | 5/5 | 5/5 | 5/4 |
| Sodium lactate | 5/5 | 5/5 | 5/4 | 5/4 | 4/3 |
| Tripotassium citrate | 5/5 | 5/5 | 5/4 | 4/4 | 4/3 |
| Disodium hydrogenphosphate | 5/5 | 5/5 | 5/4 | 5/4 | 4/3 |
| Sodium malate | 5/5 | 5/5 | 4/4 | 4/4 | 4/3 |
| Sodium tartrate | 5/5 | 5/4 | 4/4 | 4/4 | 4/3 |
| Sodium gluconate | 5/5 | 5/4 | 5/4 | 4/4 | 3/3 |
| Magnesium lactate | 5/5 | 5/5 | 5/4 | 5/4 | 4/4 |
| Magnesium dihydrogenphosphate | 5/5 | 5/5 | 5/5 | 4/5 | 4/4 |
| No addition (control) | 5/5 | 4/4 | 4/3 | 3/3 | 2/2 |

It was found that the formulation of scralose and above substances together resulted in an inhibition of the thermal degradation of sucralose in terms of the intensity and quality of sweetness at a torturous high temperature of 140° C. so that the thermal stability of sucralose was enhanced in a remarkable measure. Among the substances tested, trisodium citrate gave the marked heat stabilizing effect.

Example 47

Acidic Hard Candy

A saur hard candy was prepared using trisodium citrate which gave the most outstanding effect in Example 46 and the thermal stability of scralose under acidic conditions was evaluated. Thus, 100 parts of palatinit was mixed with 30 parts of water under stirring and the mixture was boiled down by heating at 150° C. under reduced pressure (degree of vacuum: 14.6 kPa). The pressure reduction was stopped and the system was cooled down to 140° C. Then, citric acid and trisodium citrate were added in that order at the levels indicated in Table 47 and dissolved by stirring. Then, 0.03 part of sucralose was added and the mixture was maintained at atmospheric pressure under heating at 140° C. This syrup was sampled at 10, 30 and 60 minutes and each sample was molded using a disk-shaped die to give a hard candy weighing 3 g per piece. Each of the hard candies prepared in the above manner was subjected to a sensory test for the intensity and quality of sweetness as in Example 46 to assess the thermal stability of sucralose. The results are shown in Table 47.

TABLE 47

| Level of | Level of tri- | | 140° C. holding time (min.) | | |
|---|---|---|---|---|---|
| citric acid | sodium citrate | pH | 10 | 30 | 60 |
| 2.0 | 0.2 | 2.7 | 5/5 | 5/5 | 5/5 |
| 2.0 | 0.1 | 2.5 | 5/5 | 5/5 | 5/5 |
| 2.0 | 0.02 | 2.5 | 5/5 | 5/5 | 5/4 |
| 2.0 | 0 | 2.5 | 5/4 | 3/2 | 2/2 |
| 1.0 | 0.2 | 2.8 | 5/5 | 5/5 | 5/5 |
| 1.0 | 0.1 | 2.7 | 5/5 | 5/5 | 5/5 |
| 1.0 | 0 | 2.6 | 5/5 | 3/3 | 2/2 |

[Intensity of sweetness/quality of sweetness]

It is clear from the above results that, in an acidic hard candy, the formulation of sucralose and trisodium citrate together minimizes the reductions in the intensity and quality of sweetness of sucralose at a torturous high temperature of 140° C. so that the thermal stability of sucralose is enhanced in a remarkable measure.

Example 48

Herb Candy

<Recipe>

| | | |
|---|---|---|
| 1. | Reduced maltose syrup | 50.0 |
| 2. | Palatinit | 49.0 |
| 3. | Reduced starch syrup | 21.0 |
| 4. | Sucralose | 0.02 |
| 5. | Trisodium citrate | 0.007 |
| 6. | Herb extract | 0.6 |
| 7. | Peppermint flavor | 0.2 |
| 8. | Caramel color | 0.2 |
| 9. | Water | 30.0 |

To be boiled down to 100 parts.

To the above components 1–4 was added the component 9, and using a vacuum cooker, the mixture was boiled down under a reduced pressure of 14.6 kPa up to 150° C. Then, the components 5–8 were added and the whole mixture was molded using a die under heating at a constant temperature of 150° C. and, then, cooled to give a herb candy.

In the above production flow, it took 30 minutes to complete filling the die with the whole mixture syrup at 150° C. but the herb candy obtained just after the start of filling and the herb candy obtained just before completion of filling were not different in the intensity or quality of sweetness and both had a pleasing flavor. Moreover, even after 1-year-long storage at 30° C., the herb candy retained the same sweetness (intensity and quality) and flavor showed by the candy immediately after production.

Example 49

Apple Candy

<Recipe>

| | | |
|---|---|---|
| 1. | Reduced maltose syrup | 50 |
| 2. | Palatinit | 40 |
| 3. | Reduced starch syrup | 21 |
| 4. | Reduced lactose (monohydrate) | 9 |
| 5. | Sucralose | 0.03 |
| 6. | Calcium lactate | 0.02 |
| 7. | Citric acid (crystal)N | 1.5 |
| 8. | Color | 0.02 |
| 9. | Flavor | 0.2 |
| 10. | Water | 30 |

To be boiled down to 100 parts

To the above components 1–4 was added the component 10, and the mixture was boiled down at 190° C. and atmospheric pressure and, then, cooled to 140° C. Thereafter, the components 5–9 were added and the whole mixture was molded using a die at a constant temperature of 140° C. and, then, cooled to give an apple candy (pH 2.6).

In the above production flow, it took 45 minutes to complete filling the die with the whole mixture syrup at 140° C. but the apple candy obtained just after the start of filling and the apple candy obtained just before completion of filling were not different in the intensity or quality of sweetness and both had a pleasing flavor. Moreover, even after 1-year-long storage at 40° C., the apple candy retained the sweetness (intensity and quality) and flavor shown by the candy immediately after production.

Further, except that 2 parts of a 5-fold concentrated apple juice was added in lieu of calcium lactate in the above formulation, an apple candy was prepared in: the same manner as above. As a result, this additive was found to be as effective as calcium lactate in maintaining the intensity and quality of sweetness of sucralose.

Example 50

Orange Juice-Containing Drink

<Recipe>

| | |
|---|---|
| Sucralose | 0.008 |
| Concentrated Valencia orange juce (Brix 55°) | 4.4 |
| Citric acid (crystals) | 0.16 |
| Vitamin C | 0.03 |
| Native gellan gum | 0.025 |
| Pectin | 0.0025 |
| Orange flavor (product of San-Eigen FFI Co.) | 0.25 |
| Water | Balance |
| Total | 100.0000 parts |

First, native gellan gum and pectin were added to water and the mixture was stirred at 80° C. for 10 minutes. To this mixture were added all the other components but orange flavor, and the whole was stirred under heating up to 93° C. Then, the orange flavor was added and after thorough stirring, the mixture was filled into a bottle to give an orange juice-containing drink. The concentrated Valencia orange juice (Brix 55°) was treated with hesperidinase in advance to decompose the hesperidin.

INDUSTRIAL APPLICABILITY

The present invention provides a stable form of sucralose which is of use as an edible product as such or as a formulating additive for various edible products. More particularly, the invention is concerned with a sucralose-containing composition in which the thermal stability of sucralose and the intensity and quality of sweetness of sucralose have been further improved by the formulation of one or more defined substances. By imparing thermal stability to sucralose in accordance with the present invention, the untoward phenomena such as reductions in sweetness and discoloration of sucralose upon heat-treatment or long-term storage in moisture-lean state and under low pH or other rugged conditions can be successfully precluded. Thus, through the stabilization of sucralose, the present invention facilitates the handling of sucralose and expands the versatility of sucralose in its application as a table sweetener or a sweetener for a broad variety of edible products liable to be exposed to unpredictably wide fluctuations in the environmental factors in the stages of production, storage and distribution, such as foods (inclusive of drinks) and other ingestable compositions (pharmaceutical products, quasi-drug products, etc.).

What is claimed is:

1. A method for improving the thermal stability of sucralose, the method comprising combining sucralose with at least one compound containing a purine base as a constituent selected from the group consisting of inosine, hypoxanthine, inosinic acid, adenylic acid, guanylic acid, and salts thereof, using said at least one compound in a proportion of at least 0.001 parts by weight relative to 1 part by weight of sucralose.

2. A method for improving the thermal stability of sucralose according to claim 1, wherein said at least one compound is used in a proportion of at least 0.01 parts by weight relative to 1 part by weight of sucralose.

3. A method for improving the thermal stability of sucralose according to claim 1, wherein said at least one compound is sodium inosinate.

* * * * *